United States Patent [19]

Emert et al.

[11] Patent Number: 5,340,487

[45] Date of Patent: Aug. 23, 1994

[54] DISPERSANT ADDUCTS COMPRISING ALCOHOL ADDUCTS OF DICARBOXYLIC ACID MONOEPOXY THIOL REACTION PRODUCTS

[75] Inventors: Jacob Emert, Brooklyn, N.Y.; Robert D. Lundberg, Bridgewater, N.J.

[73] Assignee: Exxon Chemical Patents Inc., Linden, N.J.

[21] Appl. No.: 109,204

[22] Filed: Aug. 19, 1993

Related U.S. Application Data

[60] Continuation of Ser. No. 974,010, Nov. 10, 1992, abandoned, which is a division of Ser. No. 722,064, Jun. 27, 1991, Pat. No. 5,205,947, which is a division of Ser. No. 268,400, Nov. 7, 1988, Pat. No. 5,057,617.

[51] Int. Cl.$^5$ ............... C10M 135/12; C10M 159/12; C07C 327/00; C07D 305/00
[52] U.S. Cl. .................. 252/46.3; 252/48.2; 252/48.6; 549/213; 549/539; 549/557; 558/251; 558/255
[58] Field of Search ............ 252/46.3, 48.2, 48.6; 549/213, 539, 557; 558/251, 255

[56] References Cited

U.S. PATENT DOCUMENTS

| | | | |
|---|---|---|---|
| 2,761,870 | 9/1956 | Payne et al. | 549/557 |
| 2,795,572 | 6/1957 | Mueller et al. | 549/539 |
| 3,041,283 | 6/1962 | Calhoun et al. | 252/48.2 |
| 3,052,657 | 9/1962 | Calhoun et al. | 252/48.2 |
| 3,073,803 | 1/1963 | Raecke et al. | 549/539 |
| 3,078,271 | 2/1963 | De Groote et al. | 260/247.5 |
| 3,156,649 | 10/1964 | Hewett et al. | 252/48.6 |
| 3,217,015 | 11/1965 | Nummy | 549/556 |
| 3,245,893 | 4/1966 | Nummy | 549/556 |
| 3,272,746 | 9/1966 | Le Suer et al. | 252/47.5 |
| 3,367,943 | 2/1968 | Miller et al. | 260/326.2 |
| 3,373,111 | 3/1968 | Le Suer et al. | 252/51.5 |
| 3,381,022 | 4/1968 | Le Suer | 260/404.8 |
| 3,442,808 | 6/1969 | Traise et al. | 252/49.6 |
| 3,458,530 | 7/1969 | Siegel et al. | 260/326.5 |
| 3,522,179 | 7/1970 | Le Suer | 252/51.5 |
| 3,539,633 | 11/1970 | Plasek et al. | 260/570.5 |
| 3,579,450 | 5/1971 | Le Suer et al. | 252/56 |
| 3,591,598 | 7/1971 | Traise et al. | 160/296 |
| 3,630,904 | 12/1971 | Musser et al. | 252/51.5 |
| 3,632,510 | 1/1972 | Le Suer | 252/35 |
| 3,705,109 | 12/1972 | Hausler et al. | 252/392 |
| 3,790,532 | 2/1974 | Fukutani et al. | 549/539 |
| 3,824,259 | 7/1974 | Oswald et al. | 549/556 |
| 3,836,470 | 9/1974 | Miller | 252/51.5 |
| 3,836,471 | 9/1974 | Miller | 252/51.5 |
| 3,842,010 | 10/1974 | Pappas et al. | 252/51.5 |
| 3,850,826 | 11/1974 | de Vries | 252/51.5 |
| 3,859,318 | 1/1975 | Le Suer | 260/410.6 |
| 3,879,308 | 4/1975 | Miller | 252/56 |
| 3,957,854 | 5/1976 | Miller | 260/482 |
| 3,957,855 | 5/1976 | Miller | 260/482 |
| 3,962,182 | 6/1976 | Steele | 260/47 |

(List continued on next page.)

FOREIGN PATENT DOCUMENTS

| | | |
|---|---|---|
| 0090629 | 5/1983 | European Pat. Off. |
| 0213027 | 3/1987 | European Pat. Off. |
| 0317353 | 5/1989 | European Pat. Off. |
| 0331398 | 9/1989 | European Pat. Off. |

OTHER PUBLICATIONS

Journal of Organic Chemistry, vol. 8 (1943), pp. 550–556, Glycidyl Esters of Aliphatic Acids.

*Primary Examiner*—Jerry D. Johnson
*Attorney, Agent, or Firm*—K. R. Walton

[57] ABSTRACT

The present invention is directed to an oil-soluble lubricating oil additive comprising at least one adduct of (A) a polyolefin of 700 to 5,000 number average molecular weight substituted with carboxylic acid producing moieties (preferably acid or anhydride moieties), and (B) a monoepoxy thiol.

27 Claims, No Drawings

U.S. PATENT DOCUMENTS

| | | | |
|---|---|---|---|
| 4,097,389 | 6/1978 | Andress, Jr. | 252/51.5 |
| 4,234,435 | 11/1980 | Meinhardt et al. | 252/51.5 |
| 4,254,020 | 3/1981 | Kline | 549/557 |
| 4,386,939 | 6/1983 | Lange | 44/74 |
| 4,428,849 | 12/1984 | Wisotsky | 252/33.4 |
| 4,455,243 | 6/1984 | Liston | 252/51.5 |
| 4,482,464 | 11/1984 | Karol et al. | 252/51.5 |
| 4,492,642 | 1/1985 | Horodysky | 252/49.6 |
| 4,517,104 | 6/1985 | Bloch et al. | 252/51.5 |
| 4,545,915 | 10/1985 | Horodysky | 252/515 |
| 4,579,674 | 4/1986 | Schlicht | 252/51.5 |
| 4,617,137 | 10/1986 | Plavac | 252/49.6 |
| 4,631,070 | 12/1986 | Plavac | 44/63 |
| 4,834,776 | 5/1989 | Axelrod et al. | 44/63 |
| 4,919,831 | 4/1990 | Horodysky | 252/48.2 |
| 4,954,572 | 9/1990 | Emert et al. | 525/285 |
| 4,957,645 | 9/1990 | Emert et al. | 252/47.5 |
| 5,026,495 | 6/1991 | Emert et al. | 252/51.5 R |
| 5,030,369 | 7/1991 | Emert et al. | 252/47.5 |
| 5,057,617 | 10/1991 | Emert et al. | 548/557 |
| 5,132,034 | 7/1992 | Hsu et al. | 252/47.5 |
| 5,205,947 | 4/1993 | Emert et al. | 252/47.5 |
| 5,215,549 | 6/1993 | Hsu et al. | 558/255 |

DISPERSANT ADDUCTS COMPRISING ALCOHOL ADDUCTS OF DICARBOXYLIC ACID MONOEPOXY THIOL REACTION PRODUCTS

This is a continuation, division of application Ser. No. 974,010, filed Nov. 10, 1992, now abandoned which is a Rule 60 Div. of Ser. No. 722,064, filed Jun. 27, 1991, now U.S. Pat. No. 5,205,947 which is a Rule 60 Div. of Ser. No. 268,400, filed Nov. 7, 1988 now U.S. Pat. No. 5,057,617.

FIELD OF THE INVENTION

This invention relates to improved oil soluble dispersant additives useful as oleaginous compositions, including fuel and lubricating oil compositions, and to concentrates containing said additives.

BACKGROUND OF THE INVENTION

U.S. Pat. No. 3,367,943 is directed to a process for preparing oil soluble additives, useful as sludge dispersants, which comprises reacting a $C_2$ to $C_5$ alkylene oxide with either (a) an alkylene succinimide derived from an aliphatic polyamine, or (b) the products obtained by reacting an alkenyl succinic arthydride, a $C_1$ to $C_{30}$ aliphatic hydrocarbon carboxylic acid and an aliphatic polyamine.

U.S. Pat. No. 3,373,111 is directed to oil-soluble nitrogen-containing compositions prepared by a process which comprises treating an acylated amine with at least 0.2 equivalents of an organic monoepoxide. The acylated amine is prepared by reacting an alkylene amine with from about 0.2 to 2 equivalents of certain acid-producing compounds, including hydrocarbyl-substituted succinic acids wherein the hydrocarbyl substituent has at least about 50 aliphatic carbon atoms. The organic epoxides which are disclosed are unsubstituted or halo-substituted.

U.S. Pat. No. 3,579,450 relates to post-treatment of oil soluble esters of mono- or polycarboxylic acids and polyhydric alcohols with from about 0.05 to 5 equivalents of an organic epoxide per equivalent of alcohol present in the ester. The organic epoxides comprise hydrocarbyl and halo-substituted hydrocarbyl epoxides. U.S. Pat. Nos. 3,859,318; 3,552,179; and 3,381,022 contain a similar disclosure of organic epoxides.

U.S. Pat. No. 3,632,510 is directed to mixed ester-metal salts which, in one embodiment, are obtained by reaction of a hydrocarbyl substituted succinic acid or anhydride with an epoxide to form an acidic ester containing unesterified carboxylic acylating groups, which is then reacted with a basically reacting metal compound to convert the unesterified carboxylic acylating groups to metal carboxylate groups. Epoxides cited as suitable are ethylene oxide, propylene oxide, styrene oxide, 1,2-butylene oxide, 2,3-butylene oxide, epichlorohydrin, cyclohexene oxide, 1,2-octylene oxide, epoxidized soya bean oil, methyl ester of 9,10-epoxy-stearic acid and butadiene epoxide. These esterification reactions are disclosed to involve ring-opening of the selected epoxide as illustrated by the reaction of ethylene oxide with a substituted succinic acid to form hydroxy-terminated esters of the formula:

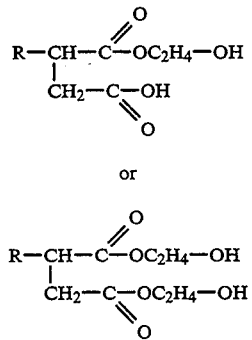

when one mole of the substituted succinic acid is reacted with one or two moles of ethylene oxide, respectively.

U.S. Pat. No. 3,630,904 discloses the pretreatment of a polyalkylene amine with an epoxide to form an intermediate which is then reacted with a hydrocarbyl-substituted succinic acid or arthydride to form a lubricating oil dispersant material. Epoxides disclosed as suitable include glycidol, ethyl ether of glycidol, amyl ether of glycidol and phenyl glycidol. However, such prereaction of the polyalkylene amine and epoxides results in phase-separation, which makes subsequent reactions to form an acceptable oil-soluble dispersant difficult. In an alternate process, the patent discloses the reaction of the hydrocarbyl-substituted succinic acid or anhydride with a polyamine, followed by reaction of the product with at least one of the above epoxides.

U.S. Pat. No. 4,386,939 relates to compositions useful as detergents and dispersants in lubricants and fuels which are prepared by reacting aminophenols and 3- or 4-membered ring heterocyclic compounds. Useful heterocyclic compounds are disclosed to include epoxides, episulfides, as iridines, oxetanes, thietanes and azetidines. Disclosed as epoxides are ethylene oxide, propylene oxide, the butene oxides, epichlorohydrin, glycidol and styrene oxide.

U.S. Pat. No. 4,492,642 is directed to additives, useful in lubricants and liquid fuels (as friction reducers, antioxidants or antiwear corrosivity reducers), which are made by reacting a borating agent with an aminated hydrocarbyl epoxide prepared by reacting a hydrocarbyl epoxide with ammonia or an ammonium compound (e.g., ammonium hydroxide).

U.S. Pat. No. 4,579,674 is directed to hydrocarbyl succinimides of a secondary hydroxyl-substituted polyamine prepared by first reacting a diamine or polyamine with a glycidyl halide, such as epichlorohydrin, to form an intermediate compound characterized by having one or more secondary hydroxyl groups, followed by reaction by this intermediate compound with a hydrocarbyl-substituted succinic anhydride. The patent requires that the amine chain in the resultant molecule be characterized by having a structural unit with a secondary hydroxyl group. The materials are disclosed to be useful as dispersants for lubricating oil compositions.

U.S. Pat. Nos. 4,617,137 and 4,63 1,070 is directed to additives useful as dispersants in lubricating oils and the like which comprise alkenyl or aryl succinimides which have been modified by treatment with glycidol. The alkenyl or alkyl succinimides are first prepared by a reaction of an alkenyl-substituted succinic anhydride with a selected polyamine, and the resulting succinimide is then contacted for reaction with glycidol, at a glycidol to basic amine nitrogen mole ratio of from about 0.2 to 1 to about 10 to 1.

Co-pending application Ser. No. 122,832, filed Nov. 19, 1987, is directed to chain-extended dispersants, prepared, for example, by contacting a long chain hydrocarbyl substituted succinimide, derived from polyalkylene polyamines, with a polyepoxide.

SUMMARY OF THE INVENTION

The present invention is directed to an oil-soluble lubricating oil additive comprising at least one polymer-substituted epoxy thioester adduct of:

(A) a polyolefin of 700 to 5,000 number average molecular weight substituted with a carboxylic acid or anhydride moiety derived from a monounsaturated carboxylic reactant comprising at least one member selected from the group consisting of (i) monounsaturated $C_3$ to $C_{10}$ dicarboxylic acid (preferably wherein (a) the carboxyl groups are located on adjacent carbon atoms and (b) at least one of said adjacent carbon atoms are part of said mono unsaturation); (ii) derivatives of (i) such as anhydrides or $C_1$ to $C_5$ alcohol derived mono- or di-esters of (i); (iii) monounsaturated $C_4$ to $C_{10}$ monocarboxylic acid wherein the carbon-carbon double bond is conjugated to the carboxy group; and (iv) derivatives of (iii) such as $C_1$ to $C_5$ alcohol derived monoesters of (iii); and (B) a monoepoxy thiol.

Suitable monoepoxy thiols include compounds of the formula:

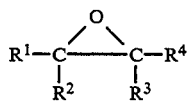

(I)

wherein $R^1$, $R^2$, $R^3$ and $R^4$ are the same or different and are H, hydrocarbyl or SH-substituted hydrocarbyl, with the proviso that at least one of the $R^1$, $R^2$, $R^3$ and $R^4$ groups comprises SH-substituted hydrocarbyl.

The polymer-substituted epoxy thioester adduct product mixture so formed can then be further contacted. with (C) a nucleophilic reactant, such as an aliphatic amine, an organic alcohol, or mixtures thereof, to form the novel dispersants of this invention.

The materials of the invention are different from the prior art because of their effectiveness and their ability to provide enhanced lubricating oil dispersancy, as exhibited by their enhanced sludge and varnish control properties.

Therefore, the present invention is also directed to novel processes for preparing the dispersant adducts of this invention. It has been observed that the products are formed in high yields without the phase separation difficulties which plagued the process of U.S. Pat. No. 3,630,904.

DETAILED DESCRIPTION OF THE INVENTION

Preparation of Carboxylic-Producing Reactant A

The long chain hydrocarbyl polymer-substituted mono- or dicarboxylic acid material, i.e., acid, anhydride or acid ester used in this invention, includes the reaction product of a long chain hydrocarbon polymer, generally a polyolefin, with a monounsaturated carboxylic reactant comprising at least one member selected from the group consisting of (i) monounsaturated $C_4$ to $C_{10}$ dicarboxylic acid (preferably wherein (a) the carboxyl groups are vicinyl, (i.e. located on adjacent carbon atoms) and (b) at least one, preferably both, of said adjacent carbon atoms are part of said mono unsaturation); (ii) derivatives of (i) such as anhydrides or $C_1$ to $C_5$ alcohol derived mono- or all-esters of (i); (iii) monounsaturated $C_3$ to $C_{10}$ monocarboxylic acid wherein the carbon-carbon double bond is conjugated to the carboxy group, i.e, of the structure

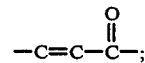

and (iv) derivatives of (iii) such as $C_1$ to $C_5$ alcohol derived monoesters of (iii). Upon reaction with the polymer, the monounsaturation of the monounsaturated carboxylic reactant becomes saturated. Thus, for example, maleic anhydride becomes a polymer substituted succinic arthydride, and acrylic acid becomes a polymer substituted propionic acid.

Typically, from about 0.7 to about 4.0 ( e.g., 0.8 to 2.6) , preferably from about 1.0 to about 2.0, and most preferably from about 1.1 to about 1.7 moles of said monounsaturated carboxylic reactant are charged to the reactor per mole of polymer charged.

Normally, not all of the polymer reacts with the monounsaturated carboxylic reactant and the reaction mixture will contain unfunctionalized polymer. The unfunctionalized polymer is typically not removed from the reaction mixture (because such removal is difficult and would be commercially infeasible) and the product mixture, stripped of any monounsaturated carboxylic reactant is employed for further reaction with the amine or alcohol as described hereinafter to make the dispersant.

Characterization of the average number of moles of monounsaturated carboxylic reactant which have reacted per mole of polymer charged to the reaction (whether it has undergone reaction or not) is defined herein as functionality. Said functionality is based upon (i) determination of the saponification number of the resulting product mixture using potassium hydroxide; and (ii) the number average molecular weight of the polymer charged, using techniques well known in the art. Functionality is defined solely with reference to the resulting product mixture. Although the amount of said unfunctionalized polymer contained in the resulting product mixture can be subsequently modified, i.e. increased or decreased by techniques known in the art, such modifications do not alter functionality as defined above. The terms "polymer substituted monocarboxylic acid material" and "polymer substituted dicarboxylic acid material" as used herein are intended to refer to the product mixture whether it has undergone such modification or not.

Accordingly, the functionality of the polymer substituted mono- and dicarboxylic acid material will be typically at least about 0.5, preferably at least about 0.7, and most preferably at least about 0.9 and will vary typically from about 0.5 to about 2.8 (e.g. , 0. 6 to 2) , preferably from about 0.8 to about 1.4, and most preferably from about 0.9 to about 1.3.

Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g. , $C_1$ to $C_4$ alkyl) acid esters of the foregoing, e.g., methyl maleate, ethyl fumarate, methyl fumarate, etc.

Preferred olefin polymers for reaction with the monounsaturated carboxylic reactants to form reactant A are polymers comprising a major molar amount of $C_2$ to $C_{10}$, e.g. $C_2$ to $C_5$ monoolefin. Such olefins include ethylene, propylene, butylene, isobutylene, pentens, octene-1, styrene, etc. The polymers can be homopolymers such as polyisobutylene, as well as copolymers of two or more of such olefins such as copolymers of: ethylene and propylene; burylens and isobutylene; propylene and isobutylene; etc. Mixtures of polymers prepared by polymerization of mixtures of isobutylene, butene-1 and butene-2, e.g., polyisobutylene wherein up to about 40% of the monomer units are derived from butene-1 and butene-2, is an exemplary, and preferred, olefin polymer. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight.

The olefin polymers used in the formation of reactant A will generally have number average molecular weights within the range of about 700 and about 5,000, preferably from about 900 to 4,000, more preferably between about 1300 and about 3,000. Particularly useful olefin polymers have number average molecular weights within the range of about 1500 and about 3000 with approximately one terminal double bond per polymer chain. An especially useful starting material for highly potent dispersant additives useful in accordance with this invention is polyisobutylene, wherein up to about 40% of the monomer units are derived from butene-1 and/or butene-2. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979. The olefin polymers will generally have a molecular weight distribution ($M_w/M_n$, that is, the ratio of the weight average molecular weight to the number average molecular weight) of from about 1.0 to 4.5, and more typically from about 1.5 to 4.0.

The polymer can be reacted with the monounsaturated carboxylic reactant by a variety of methods. For example, the polymer can be first halogenated, chlorinated or brominated to about 1 to 8 wt. %, preferably 3 to 7 wt. % chlorine, or bromine, based on the weight of polymer, by passing the chlorine or bromine through the polymer at a temperature of 60° to 250° C., preferably 110° to 160° C., e.g. 120° to 140° C., for about 0.5 to 10, preferably 1 to 7 hours. The halogenated polymer may then be reacted with sufficient monounsaturated carboxylic reactant at 100° to 250° C., usually about 180° to 235° C., for about 0.5 to 10, e.g. 3 to 8 hours, so the product obtained will contain the desired number of moles of the monounsaturated carboxylic reactant per mole of the halogenated polymer. Processes of this general type are taught in U.S. Pat. Nos. 3,087,436; 3,172,892; 3,272,746 and others. Alternatively, the polymer and the monounsaturated carboxylic reactant are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

Alternately, the polymer and the monounsaturated carboxylic reactant can be contacted at elevated temperature to cause a thermal "ene" reaction to take place. Thermal "ene" reactions have been heretofore described in U.S. Pat. Nos. 3,361,673 and 3,401,118, the disclosures of which are hereby incorporated by reference in their entirety.

Preferably, the polymers used in this invention contain less than 5 wt %, more preferably less than 2 wt %, and most preferably less than 1 wt % of a polymer fraction comprising polymer molecules having a molecular weight of less than about 300, as determined by high temperature gel permeation chromatography employing the corresponding polymer calibration curve. Such preferred polymers have been found to permit the preparation of reaction products, particularly when employing maleic anhydride as the unsaturated acid reactant, with decreased sediment. In the event the polymer produced as described above contains greater than about 5 wt % of such a low molecular weight polymer fraction, the polymer can be first treated by conventional means to remove the low molecular weight fraction to the desired level prior to initiating the ene reaction, and preferably prior to contacting the polymer with the selected unsaturated carboxylic reactant(s). For example, the polymer can be heated, preferably with inert gas (e.g., nitrogen) stripping, at elevated temperature under a reduced pressure to volatilize the low molecular weight polymer components which can then be removed from the heat treatment vessel. The precise temperature, pressure and time for such heat treatment can vary widely depending on such factors as as the polymer number average molecular weight, the amount of the low molecular weight fraction to be removed, the particular monomers employed and other factors. Generally, a temperature of from about 60° to 250° C. and a pressure of from about 0.1 to 1.0 atmospheres and a time of from about 0.5 to 20 hours (e.g., 2 to 8 hours) will be sufficient.

In this process, the selected polymer and monounsaturated carboxylic reactant and halogen (e.g., clhorine gas), where employed, are contacted for a time and under conditions effective to form the desired polymer substituted mono- or dicarboxylic acid material. Generally, the polymer and monounsaturated carboxylic reactant will be contacted in a polymer to unsaturated carboxylic reactant mole ratio usually from about 1:1 to 1:10, and preferably from about 1:1 to 1:5, at an elevated temperature, generally from about 120° to 260° C., preferably from about 160° to 240° C. The mole ratio of halogen to monounsaturated carboxylic reactant charged will also vary and will generally range from about 0.5:1 to 4:1, and more typically from about 0.7:1 to 2:1 (e.g., from about 0.9 to 1.4:1). The reaction will be generally carried out, with stirring for a time of from about 1 to 20 hours, preferably from about 2 to 6 hours.

By the use of halogen, about 65 to 95 wt. % of the polyolefin, e.g. polyisobutylene will normally react with the monounsaturated carboxylic acid reactant. Upon carrying out a thermal reaction without the use of halogen or a catalyst, then usually only about 50 to 75 wt. % of the polyisobutylene will react. Chlorination helps increase the reactivity. For convenience, the aforesaid functionality ratios of mono- or dicarboxylic acid producing units to polyolefin, e.g., 1.1 to 1.8, etc. are based upon the total amount of polyolefin, that is, the total of both the reacted and unreacted polyolefin, used to make the product.

If desired, a catalyst or promoter for reaction of the olefin polymer and monounsaturated carboxylic reactant (whether the olefin polymer and monounsaturated carboxylic reactant are contacted in the presence or absence of halogen (e.g., chlorine)) can be employed in the reaction zone. Such catalyst of promoters include alkoxides of Ti, Zr, V and Al, and nickel salts (e.g., Ni acetoacetonate and Ni iodide) which catalysts or promoters will be generally employed in an amount of from about 1 to 5,000 ppm by weight, based on the mass of the reaction medium.

The reaction is preferably conducted in the substantial absence of $O_2$ and water (to avoid competing side reactions), and to this end can be conducted in an atmosphere of dry $N_2$ gas or other gas inert under the reaction conditions. The reactants can be charged separately or together as a mixture to the reaction zone, and the reaction can be carried out continuously, semi-continuously or batchwise. Although not generally necessary, the reaction can be carried out in the presence of a liquid diluent or solvent, e.g., a hydrocarbon diluent such as mineral lubricating oil, toluene, xylene, dichlorobenzene and the like. The polymer substituted mono- or dicarboxylic acid material thus formed can be recovered from the liquid reaction mixture, e.g., after stripping the reaction mixture, if desired, with an inert gas such as $N_2$ to remove unreacted unsaturated carboxylic reactant.

The reactant A material will be contacted with the selected reactant B, monoepoxy thiol, for formation of the novel oil-soluble polymer-substituted epoxy thioester adducts of this invention, as will be more fully explained below.

Monoepoxy Thiol Reactant B

The monoepoxy-thiol reactant employed in the process of this invention comprises at least one compound having one epoxy group

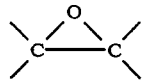

and at least one thiol group (—SH) per molecule. Preferably, each —SH group in such compounds is bonded to a carbon atom other than the two carbon atoms which comprise the epoxy group.

Generally, such reactants will comprise members selected from the group consisting of alicyclic monoepoxy compounds of the formula

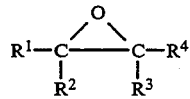

wherein $R^1$, $R^2$, $R^3$ and $R^4$ are the same or different and are H, hydrocarbyl or SH-substituted hydrocarbyl, with the proviso that at least one of the $R^1$, $R^2$, $R^3$ and $R^4$ groups comprises SH-substituted hydrocarbyl. $R^2$ and $R^3$ can together comprise ring carbon atoms in a cycloalkyl ring having from 5 to 8 carbon atoms, e.g., monocyclic monoepoxy compounds of the formula:

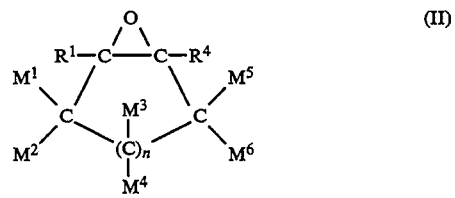

wherein n is an integer of from 1 to 4, $R^1$ and $R^4$ are as defined above, and $M^1$ through $M^6$ are the same or different and are hydrogen, hydrocarbyl or SH-substituted hydrocarbyl, and wherein one or more of $M^1$, $M^3$, and $M^6$ can further comprise —SH, with the proviso that at least one of $R^1$, $R^4$, $M^1$, $M^2$, $M^3$, $M^4$, $M^5$, and $M^6$ comprise SH-substituted hydrocarbyl.

When any of $R^1$ through $R^4$ and $M^1$ through $M^6$ are hydrocarbyl, the hydrocarbyl group can comprise substituted or unsubstituted alkyl, cycloalkyl, alkenyl, alkynyl, cycloalkenyl. Where the foregoing groups are substituted, the substituent should be non-hydroxy and may comprise acidic or basic substituent groups wherein the acids of the acidic substituent groups are characterized by a pKa of greater than 5 and the bases of the the basic substituent groups are characterized by a pKb of greater than 5.

Illustrative of suitable substituents groups on the foregoing hydrocarbyl groups are one or more of the following:

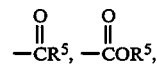

aryl, halogen-substituted aryl, nitrile and nitro, where in $R^5$ is H, $C_1$ to $C_{10}$ hydrocarbyl, or hydroxy-substituted $C_1$ to $C_{10}$ hydrocarbyl (e.g., alkyl, mono- or dihydroxy substituted alkyl, etc.).

When any of $R^1$ through $R^4$ and $M^1$ through $M^6$ are thiol-substituted hydrocarbyl, the thiol-substituted hydrocarbyl can comprise thiol-substituted alkyl, thiol-substituted cycloalkyl, thiol-substituted alkenyl, thiol-substituted alkynyl, and thiol-substituted cycloalkenyl. In addition, such thiol-substituted hydrocarbyl groups can be additionally substituted by any of the non-hydroxy substituents discussed above, such as the above discussed keto, carboxy, aryl, halogen-substituted aryl, nitrile, nitro and the like.

It will be understood that more than 1 (e.g., from 1 to 4, although generally 1 to 2) of the $R^1$, $R^2$, $R^3$ and $R^4$ groups of the components of formula I (and of the $R^1$, $R^4$ and $M^1$ through $M^6$ groups of the compounds of formula Ia) may be thiol-substituted hydrocarbyl. The thiol-substituted hydrocarbyl will generally contain from 1 to 4, preferably from 1 to 3, and most preferably 1 thiol-group per moiety of the thiol-substituted hydrocarbyl, and the monoepoxy-thiol reactant will generally contain from 1 to 4, preferably from 1 to 3, and most preferably from 1 to 2 hydroxy groups per molecule. Preferably, the monoepoxy-thiol reactant contains at least 1 hydroxy group which is a methylene-bonded hydroxy group, that is, a —CH$_2$SH group.

Where any of $R^1$ through $R^4$ or $M^1$ through $M^6$ are substituted or unsubstituted alkyl, the alkyl group will generally contain from 1 to 30 carbon atoms, preferably from 1 to 10 carbon atoms. Most preferably such alkyl groups are lower alkyl of from 1 to 5 carbon atoms. Illustrative of unsubstituted alkyl groups are methyl, ethyl , propyl, isopropyl, n-butyl, iso-butyl, pentyl, hexyl, heptyl, octyl, nonyl, decyl, dodecyl, tridecyl, tetradecyl, octadecyl, and the like. Illustrative of non-hydroxy substituted alkyl groups are $-CH_2C(O)R^6$, $-CH_2C(O)OR^6$, $-C_3H_6C(O)R^6$, $-C_3H_6C(O)OR^6$, $-C_2H_4C(O)R^6$, $-C_2H_4C(C)OR^6$, $-CH_2Ar$, $-C_2H_4Ar$, $-C_8H_{16}C(O)OR^6$, $-C_5H_{10}C(O)R^6$, $-C_2H_4Ar$, and the like. Examples of thiol-substituted hydrocarbyl groups are $-CH_2SH$, $-C_2H_5SH$, $-CH_2CH(SH)CH_2SH$, $-CH(SH)CH_2SH$, $-C_3H_6SH$, $-C_4H_8SH$, $-C_2H_4ArCH_2SH$, $-CH_2C(O)CH_2SH$, $-C_3H_6CH(CH_2SH)C(O)R^6$, and the like.

When any of $R^1$ through $R^4$ or $M^1$ through $M^6$ comprise cycloalkyl, the cycloalkyl group will generally contain from 3 to 3 0 carbon atoms, preferably from 4 to 12 carbon atoms, and most preferably from 5 to 6 carbon atoms. Exemplary of such non-hydroxy substituted cycloalkyl groups are cyclopentyl, cyclohexyl, cyclooctyl,. cyclodecyl, $C_1$ to $C_4$ alkyl-substituted cyclohexyl and the like. Exemplary of such thiol-substituted cycloalkyl groups are mercaptothylcyclohexyl, mercaptoethyl cyclopentyl and the like.

In the above examples, "Ar" comprises phenyl or naphthyl, and $R^6$ comprises alkyl of 1 to 3 carbons.

The monoepoxy thiols of formula I therefore include (a) compounds wherein $R^1$ and $R^2$ are as defined above and wherein $R^3$ is hydrogen and $R^4$ is hydrocarbyl (e.g., alkyl of 1 to 6 carbons), and (b) compounds wherein $R^1$ and $R^2$ are as defined above and both $R^3$ and $R^4$ are hydrogen. The latter group of compounds comprise terminal epoxy compounds and can be represented by the formula:

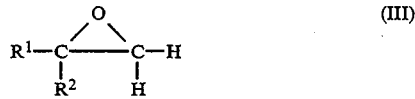

(III)

wherein $R^1$ and $R^2$ are as defined above, and wherein at least 1 of $R^1$ and $R^2$ comprise thiol-substituted hydrocarbyl having at least 1, and preferably from 1 to 4, $-CH_2SH$ groups per moiety of the thiol-substituted hydrocarbyl. Most preferably, $R^2$ is hydrogen and $R^1$ is mono-SH substituted lower alkyl, that is, alkyl having from 1 to 4 carbon atoms.

Exemplary of monoepoxy-thiols of formula III useful in the process of this invention are 2,3-epoxy-1-propanethiol, 3,4-epoxy-1-butanethiol, 2,3-epoxy-1-butanethiol, 2,3-epoxy-1-butanethiol, 2,3-epoxy-1,4-butanedithiol, 3,4-epoxy-1,5-pentanedithiol, 3,4-epoxy-1,2-butanedithiol, 4,5-epoxy-1-pentanethiol, 6,7-epoxy-1-heptanethiol, 11,12-epoxy-1-dodecanethiol, and the like.

Illustrative of non-terminal monoepoxy thiols of formula I are compounds of the formula:

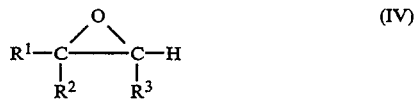

(IV)

wherein $R^1$, $R^2$ and $R^3$ are as defined above, with the further provisos that $R^3$ is not hydrogen and $R^1$ and $R^2$ cannot both be hydrogen. Exemplary of such compounds are 2,3-epoxy-3-methyl-1-butanethiol, 2,3-epoxy-1-butanethiol, 2,3-epoxy-3-ethyl-1-hexanethiol, 3,4-epoxy-4-(phenylmethyl)-1-hexanethiol, and the like.

When compounds of formula II are used, preferably "n" is 1 to 2, $R^1$, $R^4$, $M^1$, $M^2$, $M^3$ and $M^5$ are each hydrogen and at least one of $M^4$ and $M^6$ are thiol-substituted lower alkyl, e.g., $C_1$ to $C_4$ alkyl. Illustrative of such compounds are 3-mercaptomethyl cyclohexene oxide, 4-mercaptomethyl cyclohexene oxide, 3-mercaptoethyl cyclohexene oxide, 3-mercaptoethyl cyclopentene oxide and the like.

The monoepoxy thiols are known materials and can be prepared by conventional methods.

The reaction between the selected polymer substituted dicarboxylic acid material and monoepoxy thiol is carried out at any suitable temperature. Temperatures up to the decomposition points of reactants and products such as up to 200° C. or higher can be employed. In practice, one generally carries out the reaction by heating the reactants below 160° C., such as 25°–160° C., for a suitable period of time, such as a few hours.

The reaction time involved can vary widely depending on a wide variety of factors. For example, there is a relationship between time and temperature. In general, lower temperature demands longer times. In practice, we employ times of from about 0.5 to 30 hours, such as 5 to 25 hours, and preferably 3 to 10 hours.

Although one can employ a solvent, the reaction can be run without the use of any solvent. Suitable solvents are toluene, decane, ether and ester solvents.

The ratio of the equivalents of polymer substituted mono- and dicarboxylic acid material and monoepoxy thiol can vary within wide limits, but generally a molar excess of the thiol moieties will be employed. The equivalent ratio of reactants A:B will generally range from about 0.1:1 to 10:1, preferably from about 0.2:1 to 5:1, and most preferably from about 0.5:1 to 2:1 wherein the equivalents of reactant B are expressed as equivalents of thiol moieties in this reactant, and the equivalents of reactant A are expressed as equivalents of dicarboxylic acid generating moieties (aliacid, anhydride or diester groups) when the polymer substituted mono- and dicarboxylic acid material is derived from a mono-unsaturated dicarboxylic acid, anhydride or ester (reactants (i) and (ii) above) and wherein the equivalents of reactant A are expressed as equivalents of monocarboxylic acid generating moieties (monoacid or ester groups) when the polymer substituted mono- and dicarboxylic acid material is derived from a monounsaturated dicarboxylic acid, arthydride or ester (reactants (iii) and (iv) above).

If desired, the reaction of reactants A and B can be carried out in the presence of an amount of a Lewis acid catalyst, e.g., a transition metal carboxylate, alkoxide or halide, such as the lower alkanoates (e.g., acetate, propanoate, butyrate, isobutyrate, tertbutyrate, pentanoate, and the like), $C_1$ to $C_6$ alkoxides (methoxide, ethoxide, propoxide, butoxide, pentoxide, hexoxide, and the like), the chlorides and bromides, of transition metals such as Zn, Sn, Ni, Ti, Al and Co. Exemplary catalysts are stannous octanoate, zinc acetate, aluminum ethoxide, titanium tetrachloride, nickel pentanoate, cobalt decanoate, and the like. Such Lewis acid catalysts, if employed, will be generally used in an amount of from 0.01 to 10 wt. % (preferably from 0.1 to 2 wt. %) of catalyst based on the equivalents of the polymer substituted mono- and dicarboxylic acid reactant charged.

The reaction mass containing (A) and (B), following the desired reaction time in a batch process, can be stripped (e.g., with an inert gas such as N₂) to remove unreacted monoepoxy thiol reactant. Other techniques for removal of the monoepoxy thiol include extraction with a lower alkanol, such as methanol or ethanol.

In an alternative embodiment of the process of this invention, the product mixture containing the polymer-substituted epoxy thioester and excess monoepoxy thiol can be contacted with a short chain hydrocarbyl substituted mono- or dicarboxylic acid material, substituted with a C₈ to about C₂₄ hydrocarbyl group, and preferably substituted with a hydrocarbyl group containing a total of 12 to about 16, more preferably 12 to about 14, and most preferably 12 carbons, which are essentially aliphatic, saturated or unsaturated, and include alkenyl and alkyl groups, and can be straight chain or branched. The preferred short chain hydrocarbyl substituted dicarboxylic acid component is a C₈ to about C₂₄, preferably C₁₂ to C₁₄, and most preferably C₁₂ alkenyl substituted succinic anhydride.

Mono- and dicarboxylic acid anhydride materials of the above types and methods for their production are well known. For example, alkenyl substituted dicarboxylic acid arthydride can be made by the reaction of the C₈ to about C₂₄ alpha-monoolefin, or chlorinated mono-olefin, with maleic anhydride, e.g., European application 82-302326.2, incorporated herein by reference. Hydrogenation can give the corresponding alkyl derivative.

The short chain mono- and dicarboxylic reactants serve to react the remaining monoepoxy thiol and thereby reduce or eliminate the need to remove the unreacted monoepoxy thiol prior to the addition of the nucleophilic reactant (C), as will be decribed more completely hereinafter. The amount of the which is added can vary widely, and should generally be employed in an amount of from about 0.1 to 10 equivalents, and preferably from about 0.5 to 2 equivalents, of the short chain mono- and dicarboxylic reactant (based on the acid groups for the monocarboxylic reactant and on the anhydride equivalents for the dicarboxylic reactant) per equivalent of unreacted monoepoxy thiol in the polymer-substituted epoxy thioester product mixture. The short chain mono- and dicarboxylic reactant and the polymer-substituted epoxy thioester should be contacted for a time and under conditions sufficient effect substantially complete reaction of the unreacted monoepoxy thiol. Generally, any of the temperatures described above as useful in the formation of the polymer-substituted epoxy thioester can be employed.

The react ion of components A and B can be illustrated by the following equation, wherein component A is a polymer-substituted anhydride (polymer-substituted succinic anhydride) and component B is monoepoxy monohydric thiol (2,3-epoxy-1-propanethiol):

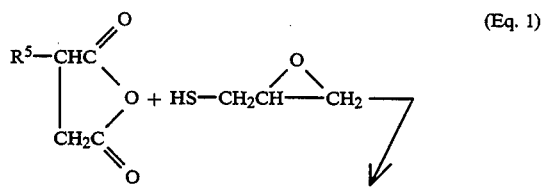
(Eq. 1)

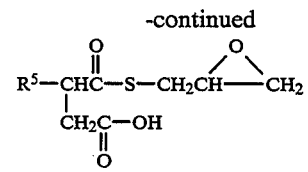
(V)

wherein R⁵ is a long chain hydrocarbyl polymer group as discussed above.

In the event reactant A comprises a dicarboxylic acid, the reaction of Components A and B to form the desired adduct can be illustrated by the as following formula:

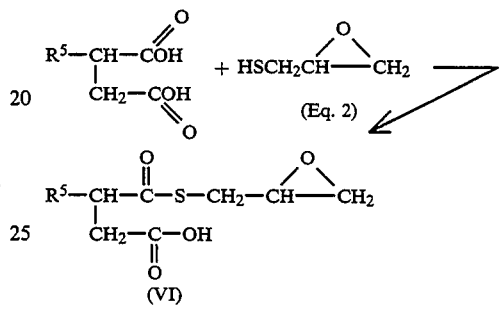
(VI)

The resulting products V and VI comprise mono-epoxy hemi-thioesters of the anhydride and contain a free carboxyl- acid or C₁ to C₅ ester group.

When reactant B comprises a monoepoxy polyhydric thiol, the reaction of Components A and B to form the desired adduct can be illustrated as follows:

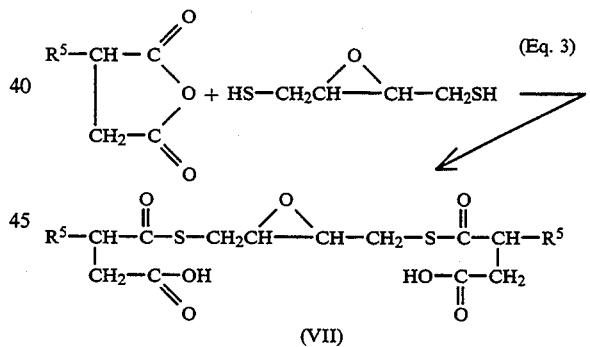
(VII)

The product mixture of the reaction of Components A and B may also contain, in addition to the desired adduct, minor amounts of by-product comprising epoxide opened adducts, which can be illustrated for Equations 1 and 2 by materials of the structural formula

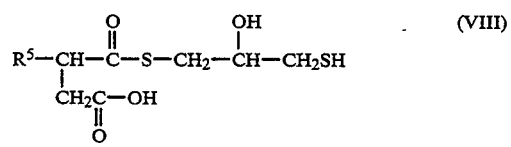
(VIII)

and materials wherein the 2,3-epoxy-1-propanethiol has reacted with, e.g., product VI of reaction (Eq. 2) above, to yield higher homologues, e.g., materials of the structural formula:

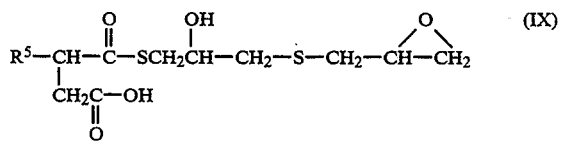

(IX)

Similarly, when the Component A comprises a polymer-substituted monocarboxylic acid (or ester), the reaction of Components A and B can be illustrated by the following equations:

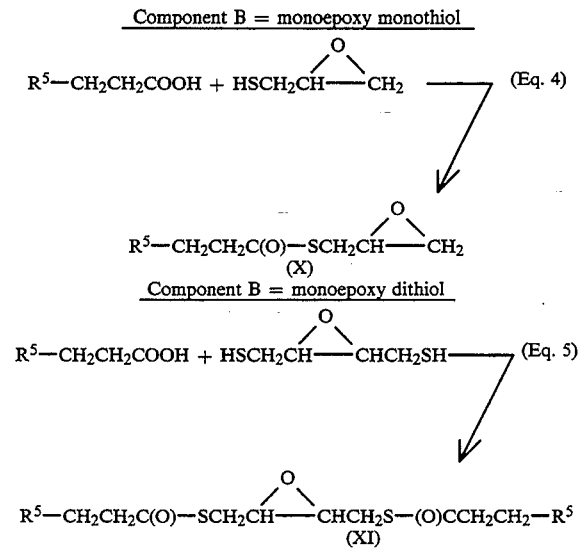

wherein $R^5$ is long chain hydrocarbyl polymer group as discussed above.

By-products, comprising epoxide opended adducts corresponding to VIII, can also be present in minor amounts in the product mixtures, and can be illustrated by the following structural formula:

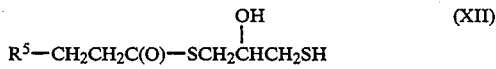

(XII)

Similarly, by-products, comprising epoxide opended adducts corresonding to XI, can be present in minor amounts in the product mixtures, and can be illustrated by the following structural formula:

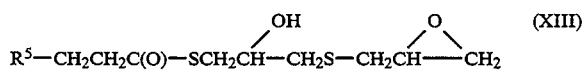

(XIII)

wherein $R^5$ is long chain hydrocarbyl polymer group as discussed above.

It is important that the reaction between Components (A) and (B) be carried out in the substantial absence of Lewis base (e.g., basic nitrogen-containing compounds, e.g., primary, secondary, and tertiary amine compounds and basic inorganic hydroxy compounds, e.g., alkali metal hydroxides) which are capable of catalyzing the ring-opening of the epoxy-group of Component (B) under the conditions of the reaction. Preferably, the reaction mixture contains less than about 0.1, and more preferably less than 0.01, equivalent of Lewis base per epoxide group equivalent of Reactant B.

Preferably, the polymer-substituted dicarboxylic acid producing material and monoepoxy thiol will be contacted for a time and under conditions sufficient to react at least 75% of the arthydride equivalents in reactant A, and the polymer-substituted monocarboxylic acid producing material and monoepoxy thiol will be contacted for a time and under conditions sufficient to react at least 75% of the acid equivalents in reactant A. The progress of this reaction can be followed by infrared analysis to observe the appearance of an thioester carbonyl band.

Component C

The polymer-substituted epoxy thioester adducts of this invention, prepared in accordance with the reaction process described above, can then be contacted, in a separate step, for reaction with (C) a nucleophilic reactant, e.g., amines, alcohols, including polyols, aminoalcohols, etc. to form the novel dispersants of this invention. This second reaction step is intended to react wthe epoxy thioester groups with the reactive nucleophilic group to introduce, e.g. nitrogen molecules, ester groups, etc., into the adducts for enhanced dispersancy properties.

Amine compounds useful as nucleophilic reactants for reaction with the hydrocarbyl substituted dicarboxylic acid materials include mono- and (preferably) polyamines, of about 2 to 60, preferably 2 to 40 (e.g. 3 to 20), total carbon atoms and about 1 to 12, preferably 3 to 12, and most preferably 3 to 9 nitrogen atoms in the molecule. These amines may be hydrocarbyl amines or may be hydrocarbyl amines including other groups, e.g, hydroxy groups, alkoxy groups, amide groups, nitriles, imidazoline groups, and the like. Hydroxy amines with 1 to 6 hydroxy groups, preferably i to 3 hydroxy groups are particularly useful. Preferred amines are aliphatic saturated amines, including those of the general formulas:

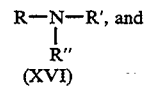

(XVI)

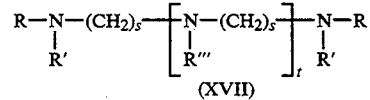

(XVII)

wherein R, R', R" and R'" are independently selected from the group consisting of hydrogen $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein R'" can additionally comprise a moiety of the formula:

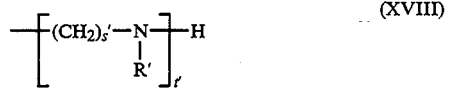

(XVIII)

wherein R' is as defined above, and wherein s and s' can be the same or a different number of from 2 to 6, preferably 2 to 4; and t and t' can be the same or different and are numbers of from 0 to 10, preferably 2 to 7, and most preferably about 3 to 7, with the proviso that the sum of t and t' is not greater than 15. To assure a facile reaction, it is preferred that R, R', R", R'", s, s', t and t' be selected in a manner sufficient to provide the compounds of Formulas XVI and XVII with typically at least one primary or secondary amine group, preferably at least two primary or secondary amine groups. This can be achieved by selecting at least one of said R, R', R" or R''' groups to be hydrogen or by letting t in Formula XVII be at least one when R''' is H or when the XVIII moiety possesses a secondary amino group. The most preferred amine of the above formulas are represented by Formula XVII and contain at least two primary amine groups and at least one, and preferably at least three, secondary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene) triamine; N,N-dimethyl-1,3-diaminopropane; N,N-di-(2-aminoethyl) ethylene diamine; N,N-di(2-hydroxyethyl) -1,3-propylene diamine; 3-dodecyloxypropylamine; N-dodecyl-1,3 -propane diamine; tris hydroxymethylaminomethane (THAM); diisopropanol amine: diethanol amine; triethanol amine; mono-, di-, and tri-tallow amines; amino morpholines such as N-(3-aminopropyl)morpholine; and mixtures thereof.

Other useful amine compounds include: alicyclic diamines such as 1,4-di(aminomethyl) cyclohexane, and heterocyclic nitrogen compounds such as imidazolines, and N-aminoalkyl piperazines of the general formula (XIX):

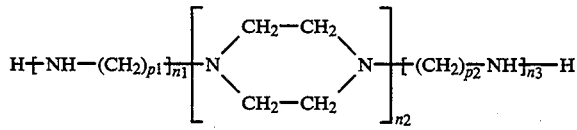

wherein $p_1$ and $p_2$ are the same or different and are each integers of from 1 to 4, and $n_1$, $n_2$ and $n_3$ are the same or different and are each integers of from 1 to 3. Non-limiting examples of such amines include 2-pentadecyl imidazoline; N-(2-aminoethyl) piperazine; etc.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. Low cost poly (ethyleneamines) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formulae:

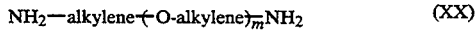

where m has a value of about 3 to 70 and preferably 10 to 35; and

where "n" has a value of about 1 to 40 with the provision that the sum of all the n's is from about 3 to about 70 and preferably from about 6 to about 35, and R is a polyvalent saturated hydrocarbon radical of up to ten carbon atoms wherein the number of substituents on the R group is represented by the value of "a", which is a number of from 3 to 6. The alkylene groups in either formula (XX) or (XXI) may be straight or branched chains containing about 2 to 7, and preferably about 2 to 4 carbon atoms.

The polyoxyalkylene polyamines of formulas (XX) or (XXI) above, preferably polyoxyalkylene diamines and polyoxyalkylene triamines, may have average molecular weights ranging from about 200 to about 4000 and preferably from about 400 to about 2000. The preferred polyoxyalkylene polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

Additional amines useful in the present invention are described in U.S. Pat. No. 3,445,441, the disclosure of which is hereby incorporated by reference in its entirety.

A particularly useful class of amines are the polyamido and related amines disclosed in co-pending Ser. No. 126,405, filed Nov. 30, 1987, which comprise reaction products of a polyamine and an alpha, beta unsaturated compound of the formula:

wherein X is sulfur or oxygen, Y is $-OD^8$, $-SD^8$, or $-ND^8(D^9)$, and $D^5$, $D^6$, $D^7$, $D^8$ and $D^9$ are the same or different and are hydrogen or substituted or unsubstituted hydrocarbyl. Any polyamine, whether aliphatic, cycloaliphatic, aromatic, heterocyclic, etc., can be employed provided it is capable of adding across the acrylic double bond and amidifying with for example the carbonyl group (—C(O)—) of the acrylate-type compound of formula XXII, or with the thiocarbonyl group (—C(S)—) of the thioacrylate-type compound of formula XXII.

When $D^5$, $D^6$, $D^7$, $D^8$ or $D^9$ in Formula XXII are hydrocarbyl, these groups can comprise alkyl, cycloalkyl, aryl, alkaryl, aralkyl or heterocyclic, which can be substituted with groups which are substantially inert to any component of the reaction mixture under conditions selected for preparation of the amido-amine. Such substituent groups include hydroxy, halide (e.g., Cl, Fl, I, Br), —SH and alkylthio. When one or more of $D^5$ through $D^9$ are alkyl, such alkyl groups can be straight or branched chain, and will generally contain from 1 to 20, more usually from 1 to 10, and preferably from 1 to 4, carbon atoms. Illustrative of such alkyl groups are methyl, ethyl, propyl, butyl, pentyl, hexyl, heptyl, octyl, nonyl, decyl, dodecyl, tridecyl, hexadecyl, octadecyl and the like. When one or more of $D^5$ through $D^9$ are aryl, the aryl group will generally contain from 6 to 10 carbon atoms ( e.g., phenyl, naphthyl).

When one or more of $D^5$ through $D^9$ are alkaryl, the alkaryl group will generally contain from about 7 to 20 carbon atoms, and preferably from 7 to 12 carbon atoms. Illustrative of such alkaryl groups are tolyl, m-ethylphenyl, o-ethyltolyl, and m-hexyltolyl. When one or more of $D^5$ through $D^9$ are aralkyl, the aryl component generally consists of phenyl or ($C_1$ to $C_6$) alkyl-substituted phenol and the alkyl component generally contains from 1 to 12 carbon atoms, and preferably from 1 to 6 carbon atoms. Examples of such aralkyl groups are benzyl, o-ethylbenzyl, and 4-isobutylbenzyl. When one or more of $D^5$ and $D^9$ are cycloalkyl, the cycloalkyl group will generally contain from 3 to 12 carbon atoms, and preferably from 3 to 6 carbon atoms. Illustrative of such cycloalkyl groups are cyclopropyl, cyclobutyl, cyclohexyl, cyclooctyl, and cyclododecyl. When one or more of $D^5$ through $D^9$ are heterocyclic, the heterocyclic group generally consists of a compound having at least one ring of 6 to 12 members in which on or more ring carbon atoms is replaced by oxygen or nitrogen. Examples of such heterocyclic groups are furyl, pyranyl, pyridyl, piperidyl, dioxanyl, tetrahydrofuryl, pyrazinyl and 1,4-oxazinyl.

The alpha, beta ethylenically unsaturated carboxylate compounds employed herein have the following formula:

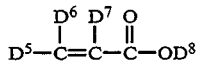

(XXIII)

wherein $D^5$, $D^6$, $D^7$, and $D^8$ are the same or different and are hydrogen or substituted or unsubstituted hydrocarbyl as defined above. Examples of such alpha, beta-ethylenically unsaturated carboxylate compounds of formula XXIII are acrylic acid, mothacrylic acid, the methyl, ethyl, isopropyl, n-butyl, and isobutyl esters of acrylic and methacrylic acids, 2-butenoic acid, 2-hexenoic acid, 2-decenoic acid, 3-methyl-2-heptenoic acid, 3-methyl-2-butenoic acid, 3-phenyl-2-propenoic acid, 3-cyclohexyl-2-butenoic acid, 2-methyl-2-butenoic acid, 2-propyl-2-propenoic acid, 2-isopropyl-2-hexenoic acid, 2,3-dimethyl-2-butenoic acid, 3-cyclohexyl-2-methyl-2-pentenoic acid, 2-propenoic acid, methyl 2-propenoate, methyl 2-methyl 2-propenoate, methyl 2-butenoate, ethyl 2-hexenoate, isopropyl 2-decenoate, phenyl 2-pentenoate, tertiary butyl 2-propenoate, octadecyl 2-propenoate, dodecyl 2-decenoate, cyclopropyl 2,3-dimethyl-2-butenoate, methyl 3-phenyl-2-propenoate, and the like.

The alpha, beta ethylenically unsaturated carboxylate thioester compounds employed herein have the following formula:

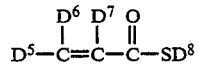

(XXIV)

wherein $D^5$, $D^6$, $D^7$, and $D^8$ are the same or different and are hydrogen or substituted or unsubstituted hydrocarbyl as defined above. Examples of such alpha, beta-ethylenically unsaturated carboxylate thioesters of formula XXIV are methylmercapto 2-butenoate, ethylmercapto 2-hexenoate, isopropylmercapto 2-decenoate, phenylmercapto 2-pentenoate, tertiary butylmercapto 2-propenoate, octadecylmercapto 2-propenoate, dodecylmercapto 2-decenoate, cyclopropylmercapto 2,3-dimethyl-2-butenoate, methylmercapto 3-phenyl-2-propenoate, methylmercapto 2-propenoate, methylmercapto 2-methyl-2-propenoate, and the like.

The alpha, beta ethylenically unsaturated carboxyamide compounds employed herein have the following formula:

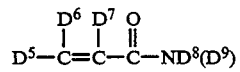

(XXV)

wherein $D^5$, $D^6$, $D^7$, $D^8$ and $D^9$ are the same or different and are hydrogen or substituted or unsubstituted hydrocarbyl as defined above. Examples of alpha, beta-ethylenically unsaturated carboxyamides of formula XXV are 2-butenamide, 2-hexenamide, 2-decenamide, 3-methyl-2-heptenamide, 3-methyl-2-butenamide, 3-phenyl-2-propenamide, 3-cyclohexyl-2-butenamide, 2-methyl-2-butenamide, 2-propyl-2-propenamide, 2-isopropyl-2-hexenamide, 2,3-dimethyl-2-butenamide, 3-cyclohexyl-2-methyl-2-pentenamide, N-methyl 2-butenamide, N-methyl 2-butenamide, N,N-diethyl 2-hexenamide, N-isopropyl 2-decenamide, N-phenyl 2-pentenamide, N-tertiary butyl 2-propenamide, N-octadecyl 2-propenamide, N-N-didodecyl 2-decenamide, N-cyclopropyl 2,3-dimethyl-2-butenamide, N-methyl 3-phenyl-2-propenamide, 2-propenamide, 2-methyl-2-propenamide, 2-ethyl-2-propenamide and the like.

The alpha, beta ethylenically unsaturated thiocarboxylate compounds employed herein have the following formula:

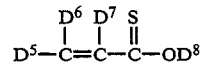

(XXVI)

wherein $D^5$, $D^6$, $D^7$, $D^8$ and $D^9$ are the same or different and are hydrogen or substituted or unsubstituted hydrocarbyl as defined above. Examples of alpha, beta-ethylenically unsaturated thiocarboxylate compounds of formula XXVI are 2-butenthioic acid, 2-hexenthioic acid, 2-decenthioic acid, 3-methyl-2-heptenthioic acid, 3-methyl-2-butenthioic acid, 3-phenyl-2-propenthioic acid, 3-cyclohexyl-2-butenthioic acid, 2-methyl-2-butenthioic acid, 2-propyl-2-propenthioic acid, 2-isopropyl-2-hexenthioic acid, 2,3-dimethyl-2-butenthioic acid, 3-cyclohexyl-2-methyl-2-pententhioic acid, 2-propenthioic acid, methyl 2-propenthioate, methyl 2-methyl 2-propenthioate, methyl 2-butenthioate, ethyl 2-hexenthioate, isopropyl 2-decenthioate, phenyl 2-pententhioate, tertiary butyl 2-propenthioate, octadecyl 2-propenthioate, dodecyl 2-decenthioate, cyclopropyl 2,3-dimethyl-2-butenthioate, methyl 3-phenyl-2-propenthioate, and the like.

The alpha, beta ethylenically unsaturated dithioic acid and acid ester compounds employed herein have the following formula:

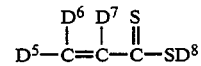

(XXVII)

wherein $D^5$, $D^6$, $D^7$, and $D^8$ are the same or different and are hydrogen or substituted or unsubstituted hydrocarbyl as defined above. Examples of alpha, beta-ethylenically unsaturated dithioic acids and acid esters of formula XXVII are 2-butendithioic acid, 2-hexendithioic acid, 2-decendithioic acid, 3-methyl-2-heptendithioic acid, 3-methyl-2-butendithioic acid, 3-phenyl-2-propendithioic acid, 3-cyclohexyl-2-butendithioic acid, 2-methyl-2-butendithioic acid, 2-propyl-2-propendithioic acid, 2-isopropyl-2-hexendithioic acid, 2,3-dimethyl-2-butendithioic acid, 3-cyclohexyl-2-methyl-2-pentendithioic acid, 2-propendithioic acid, methyl 2-propendithioate, methyl 2-methyl 2-propendithioate, methyl 2-butendithioate, ethyl 2-hexendithioate, isopropyl 2-decendithioate, phenyl 2-pentendithioate, tertiary butyl 2-propendithioate, octadecyl 2-propendithioate, dodecyl 2-decendithioate, cyclopropyl 2,3-dimethyl-2-butendithioate, methyl 3-phenyl-2-propendithioate, and the like.

The alpha, beta ethylenically unsaturated thiocarboxyamide compounds employed herein have the following formula:

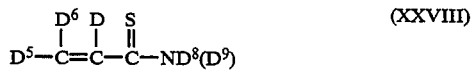
(XXVIII)

wherein $D^5$, $D^6$, $D^7$, $D^8$ and $D^9$ are the same or different and are hydrogen or substituted or unsubstituted hydrocarbyl as defined above. Examples of alpha, beta-ethylenically unsaturated thiocarboxyamides of formula XXVIII are 2-butenthioamide, 2-hexenthioamide, 2-decenthioamide, 3-methyl -2-heptenthioamide, 3-methyl-2-butenthioamide 3-phenyl-2-propenthioamide, 3-cyclohexyl -2-butenthioamide, 2-methyl-2-butenthioamide, 2-propyl-2-propenthioamide, 2-isopropyl-2-hexenthioamide, 2,3-dimethyl-2-butenthioamide, 3-cyclohexyl-2 -methyl-2-pententhioamide, N-methyl 2-butenthioamide, N,N-diethyl 2-hexenthioamide, N-isopropyl 2-decenthioamide, N-phenyl 2-pententhioamide, N-tertiary butyl 2-propenthioamide, N-octadecyl 2-propenthioamide, N-N-didodecyl 2-decenthioamide, N-cyclopropyl 2,3-dimethyl-2-butenthioamide, N-methyl 3-phenyl-2-propenthioamide, 2-propenthioamide, 2-methyl-2-propenthioamide, 2-ethyl-2-propenthioamide and the like.

Preferred compounds for reaction with the polyamines in accordance with this invention are lower alkyl esters of acrylic and (lower alkyl) substituted acrylic acid. Illustrative of such preferred compounds are compounds of the formula:

(XXIX)

where $D^7$ is hydrogen or a $C_1$ to $C_4$ alkyl group, such as methyl, and $D^8$ is hydrogen or a $C_1$ to $C_4$ alkyl group, capable of being removed so as to form an amido group, for example, methyl, ethyl, propyl, isopropyl, butyl, sec-butyl, tert-butyl, aryl, hexyl, etc. In the preferred embodiments these compounds are acrylic and methacrylic esters such as methyl or ethyl acrylate, methyl or ethyl methacrylate. When the selected alpha, beta-unsaturated compound comprises a compound of formula XXII wherein X is oxygen, the resulting reaction product with the polyamine contains at least one amido linkage (—C(O)N<) and such materials are herein termed "amido-amines." Similarly, when the selected alpha, beta unsaturated compound of formula XXII comprises a compound wherein X is sulfur, the resulting reaction product with the polyamine contains thioamide linkage (—C(S)N<) and these materials are herein termed "thioamido-amines." For convenience, the following discussion is directed to the preparation and use of amido-amines, although it will be understood that such discussion is also applicable to the thioamido-amines.

The type of amido-amine formed varies with reaction conditions. For example, a more linear amido-amine is formed where substantially equimolar amounts of the unsaturated carboxylate and polyamine are reacted. The presence of excesses of the ethylenically unsaturated reactant of formula XXII tends to yield an amido-amine which is more cross-linked than that obtained where substantially equimolar amounts of reactants are employed. Where for economic or other reasons a cross-linked amido-amine using excess amine is desired, generally a molar excess of the ethylenically unsaturated reactant of about at least 10%, such as 10–300%, or greater, for example, 25–200%, is employed. For more efficient cross-linking an excess of carboxylated material should preferably be used since a cleaner reaction ensues. For example, a molar excess of about 10–100% or greater such as 10–50%, but preferably an excess of 30–50%, of the carboxylated material. Larger excess can be employed if desired.

In summary, without considering other factors, equimolar amounts of reactants tend to produce a more linear amido-amine whereas excess of the formula XXII reactant tends to yield a more cross-linked amido-amine. It should be noted that the higher the polyamine (i.e., the greater the number of amino groups on the molecule) the greater the statistical probability of cross-linking since, for example, a tetraalkylenepentamine, such as tetraethylene pentamine

has more labile hydrogens than ethylene diamine.

These am ido-amine adducts so formed are characterized by both amido and amino groups. In their simplest embodiments they may be represented by units of the following idealized formula (XXX):

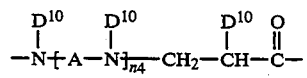

wherein the $D^{10}$'s, which may be the same or different, are hydrogen or a substituted group, such as a hydrocarbon group, for example, alkyl, alkenyl, alkynyl, aryl, etc., and A is a moiety of the polyamine which, for example, may be aryl, cycloalkyl, alkyl, etc., and $n_4$ is an integer such as 1–10 or greater.

The above simplified formula represents a linear amido-amine polymer. However, cross-linked polymers may also be formed by employing certain conditions since the polymer has labile hydrogens which can further react with either the unsaturated moiety by adding across the double bond or by amidifying with a carboxylate group.

Preferably, however, the amido-amines employed in this invention are not cross-linked to any substantial degree, and more preferably are substantially linear.

Preferably, the polyamine reactant contains at least one primary amine (and more preferably from 2 to 4 primary amines) group per molecule, and the polyamine and the unsaturated reactant of formula XXIX are contacted in an amount of from about 1 to 10, more preferably from about 2 to 6, and most preferably from about 3 to 5, equivalents of primary amine in the polyamine reactant per mole of the unsaturated reactant of formula XXIX.

The reaction between the selected polyamine and acrylate-type compound is carried out at any suitable temperature. Temperatures up to the decomposition points of reactants and products can be employed. In practice, one generally carries out the reaction by heating the reactants below 100° C., such as 80°-90° C., for a suitable period of time, such as a few hours. Where an acrylic-type ester is employed, the progress of the reaction can be judged by the removal of the alcohol in forming the amide.

During the early part of the reaction alcohol is removed quite readily below 100° C. in the case of low boiling alcohols such as methanol or ethanol. As the reaction slows, the temperature is raised to push the polymerization to completion and the temperature may be raised to 150° C. toward the end of the reaction. Removal of alcohol is a convenient method of Judging the progress and completion of the reaction which is generally continued until no more alcohol is evolved. Based on removal of alcohol, the yields are generally stoichiometric. In more difficult reactions, yields of at least 95% are generally obtained.

Similarly, it will be understood that the reaction of an ethylenically unsaturated carboxylate thioester of formula XXII liberates the corresponding $HSD^8$ compound (e.g., $H_2S$ when $D^8$ is hydrogen) as a by-product, and the reaction of an ethylenically unsaturated carboxyamide formula XXII liberates the corresponding $HSD^8$ compound compound (e.g., ammonia when $D^8$ and $D^9$ are each hydrogen) as by-product.

provided it is capable of adding to the epoxy group of the polymer-substituted epoxy thioester to open the epoxy ring.

Preparation of the Dispersant

The amine is readily reacted with the selected polymer-substituted epoxy thioester, e.g., the hemi-thioester of alkenyl succinic anhydride, by reacting an oil solution containing 5 to 95 wt. % of the polymer-substituted epoxy thioester adduct material at about 0° to 175° C., preferably 80° to 120° C., generally for 1 to 10, e.g., 2 to 6 hours until the desired ring-opened product is obtained. Reaction ratios of polymersubstituted epoxy thioester adduct material to equivalents of amine as well as the other nucleophilic reactants described herein can vary considerably, depending on the reactants and type of bonds formed. Generally from 0.05 to 1.0, preferably from about 0.1 to 0.6, e.g., 0.2 to 0.4, equivalents of epoxide moiety content is used per equivalent of nucleophilic reactant, e.g., amine. Preferably, the polymer substituted mono- or dicarboxylic acid producing material and amine will be contacted for a time and under conditions sufficient to react substantially all of the primary nitrogens in the amine reactant. The progress of this reaction can be followed by infrared analysis.

The amine-containing dispersants of the present invention can be illustrated by the following structural formula, wherein the polymer-substituted epoxy thioester adduct, formed as illustrated in Equation 1 above, is reacted with an alkylene polyamine of Formula XVII (wherein each R and R' are hydrogen) in the process of this invention:

$$R^5-\underset{\underset{\underset{O}{\parallel}}{\overset{|}{CH_2COH}}}{CH}-\overset{O}{\overset{\parallel}{C}}-S-CH_2\overset{OH}{\overset{|}{C}}HCH_2-NH-(CH_2)_s-[NH(CH_2)_s]_t-NH-Y \quad (XXXI)$$

The reaction time involved can vary widely depending on a wide variety of factors. For example, there is a relationship between time and temperature. In general, lower temperature demands longer times. Usually, reaction times of from about 2 to 30 hours, such as 5 to 25 hours, and preferably 3 to 10 hours will be employed.

Although one can employ a solvent, the reaction can be run without the use of any solvent. In fact, where a high degree of cross-linking is desired, it is preferred to avoid the use of a solvent and most particularly to avoid a polar solvent such as water. However, taking into consideration the effect of solvent on the reaction, where desired, any suitable solvent can be employed, whether organic or inorganic, polar or non-polar.

As an example of the amido-amine adducts, the reaction of tetraethylene pentaamine (TEPA) with methyl acrylate can be illustrated as follows:

wherein $R^5$, s and t are as defined above and wherein comprises H or the moiety of the formula:

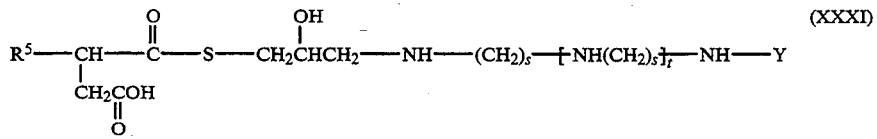

wherein $R^5$ is as defined above. It is to be noted that the product (XXXI) is characterized by secondary-amino groups as a result of the amine-epoxy group reaction. Such secondary amino groups are distinguished from the less potent tertiary nitrogens of the products formed in the process of U.S. Pat. No. 4,617,137.

Similarly, the amine-containing dispersant of this invention, prepared from polymer-substituted monocarboxylic epoxy thioester adducts, can be illustrated by the following structural formula, wherein the polymer-

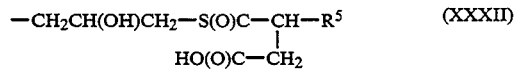

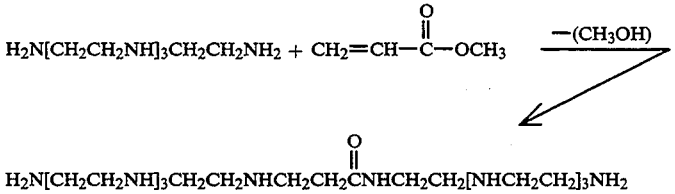

Thus, any polyamine, whether aliphatic, cycloaliphatic, aromatic, heterocyclic, etc., can be employed substituted epoxy thioester is formed as described above for Equation 4, and the resulting product is reacted with a polyamine for formula XVII above (wherein R and R' are each hydrogen):

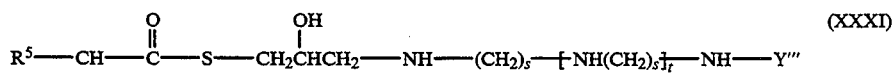
(XXXI)

wherein $R^5$, s and t are as defined above, and wherein Y''' comprises H or the moiety:

$$-CH_2CH(OH)CH_2-S(O)C-CH_2-R^5. \quad (XXXIV)$$

An example of the reaction of an amido-amine reactant with a polymer-substituted epoxy thioester adduct which can be illustrated as follows, wherein the amido-amine reactant comprises a polyamido-amine having two terminal —NH$_2$ groups:

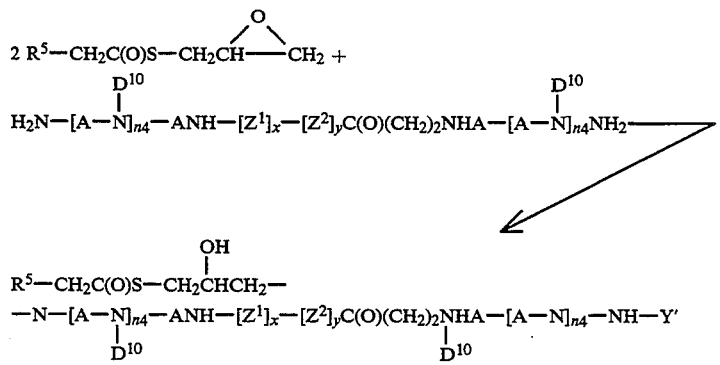

wherein x and y are each integers of from 0 to 10, $R^5$ is as defined above, $Z^1$ and $Z^2$ are moieties of the formula (XXXIVa):

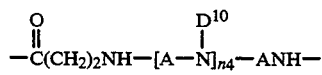

wherein $D^{10}$, A and $n_4$ are as defined above for Formula XXVIII, and Y' comprises H or the moiety:

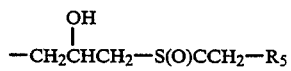

wherein $R^5$ is as defined above. Preferred are amido-amine reaction products of the above equation wherein $D^{10}$ is H, and most preferably wherein x and y are each zero, A is —(CH$_2$)$_2$— and Y' is the above moiety.

It will be understood that the amine reactant can comprise one or a mixture of any of the above described amines, such as a mixture of an amido-amine and a polyalkylene polyamine.

The nitrogen containing dispersants can be further treated by boration as generally taught in U.S. Pat. Nos. 3,087,936 and 3,254,025 (incorporated herein by reference thereto). This is readily accomplished by treating the selected nitrogen containing dispersant with a boron compound selected from the class consisting of boron oxide, boron halides, boron acids and esters of boron acids in an amount to provide from about 0.1 atomic proportion of boron for each mole of said nitrogen composition to about 20 atomic proportions of boron for each atomic proportion of nitrogen of said nitrogen composition. Usefully the dispersants of the inventive combination contain from about 0.05 to 2.0 wt. %, e.g. 0.05 to 0.7 wt. % boron based on the total weight of said borated nitrogen compound. The boron, which appears to be in the product as dehydrated boric acid polymers (primarily (HBO$_2$)$_3$), is believed to attach to the dispersant as amine salts, e.g., the metaborate salt of said amine dispersants.

Treating is readily carried out by adding from about 0.05 to 4, e.g. 1 to 3 wt. % (based on the weight of said nitrogen compound) of said boron compound, preferably boric acid which is most usually added as a slurry to said nitrogen compound and heating with stirring at from about 135° C. to 190° e.g. 140°–170° C., for from 1 to 5 hours followed by nitrogen stripping at said temperature ranges. Or, the boron treatment can be carried out by adding boric acid to the hot reaction mixture of the dicarboxylic acid material and amine while removing water.

The polymer-substituted epoxy thioester adducts of this invention may also be reacted with hydroxy compounds having at least 6 carbon atoms such as monohydric alcohols (such as aliphatic and cycloaliphatic alcohols of at least 6 carbon atoms) and polyhydric alcohols or aromatic compounds such as phenols and naphthols, etc. to form ether alcohols. The polyhydric alcohols are the most preferred hydroxy compound and preferably contain from 2 to about 10 hydroxy radicals, for example, ethylene glycol, diethylene glycol, triethylene glycol, tetraethylene glycol, dipropylene glycol, and other alkylene glycols in which the alkylene radical contains from 2 to about 8 carbon atoms. Other useful polyhydric alcohols include glycerol, mono-oleate of glycerol, monostearate of glycerol, monomethyl ether of glycerol, pentaerythritol, dipentaerythritol, and mixtures thereof.

The polymer-substituted epoxy thioester adducts may also be reacted with unsaturated alcohols such as allyl alcohol, cinnamyl alcohol, propargyl alcohol, 1-cyclohexane-3-ol, and oleyl alcohol. Still other classes of the alcohols capable of yielding the thioesters of this invention comprise the ether-alcohols and amino-alcohols including, for example, the oxy-alkylene, oxy-arylene-, amino-alkylene-, and amino-arylene-substituted alcohols having one or more oxy-alkylene, amino-alkylene or amino-arylene oxy-arylene radicals. They are exemplified by Cellosolve, Carbitol, N,N,N',N'-tetrahydroxytrimethylene di-amine, and ether-alcohols having up to about 150 oxy-alkylene radicals in which the alkylene radical contains from 1 to about 8 carbon atoms.

The reaction of the Polymer-substituted epoxy thioester adducts with the above cited hydroxy compounds can take place in the presence of a Lewis base catalyst, such as tertiary amines (e.g., pyridine) alkaline metal hydroxides (e.g., sodium hydroxide, potassium hydroxide, and the like), metal alkoxides (e.g., the Na, Ti, K, and Al methoxides, ethoxides, propoxides and the like).

The thioester dispersants may be borated, similar to the nitrogen containing dispersants, as described above.

Hydroxyaminee which can be reacted with the aforesaid polymer-substituted epoxy thioester adducts of this invention to form dispersants include 2-amino-1-butanol, 2-amino-2-methyl-1-propanol, p-(beta-hydroxyethyl)-aniline, 2-amino-1-propanol, 3-amino-1-propanol, 2-amino-2-methyl-1,3-propane-diol, 2-amino-2-ethyl-1,3-propanediol, N-(beta-hydroxy-propyl)-N'-(beta-aminoethyl)-piperazine, tris(hydroxymethyl) amino-methane (also known as trismethylolaminomethane), 2-amino-1-butanol, ethanolamine, beta-(beta-hydroxyethoxy) ethylamine, and the like. Mixtures of these or similar amines can also be employed. The above description of nucleophilic reactants suitable for reaction with the polymer-substituted epoxy thioester adducts of this invention includes amines, alcohols, and compounds of mixed amine and hydroxy containing reactive functional groups, i.e., amino-alcohols.

Tris(hydroxymethyl) amino methane (TMAM) can be reacted with the aforesaid polymer-substituted epoxy thioester adducts of this invention to form amino-alcohol dispersants or amino-ether-alcohol dispersants.

A preferred group of ashless dispersants of this invention are those derived from (A) polyisobutylene substituted with succinic anhydride groups, and reacted with (B) 2,3-epoxy-1-propanethiol, to form a polymer-substituted epoxy thioester adduct which is then reacted with polyethylene amines, e.g., tetraethylene pentamine, pentaethylene hexamine, polyoxyethylene and polyoxypropylene amines, e.g., polyoxypropylene diamine, trismethylolaminomethane and pentaerythritol, and combinations thereof.

The nitrogen-containing dispersant materials of the instant invention as described above can be post-treated by contacting said nitrogen-containing dispersant materials with one or more post-treating reagents selected from the group consisting of ethyl acetoacetate, carbon disulfide, sulfur, sulfur chlorides, alkenyl cyanides, aldehydes, ketones, urea, thio-urea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyantes, epoxides, episulfides, formaldehyde or formaldehyde-producing compounds plus phenols, and sulfur plus phenols, and $C_1$ to $C_{30}$ hydrocarbyl substituted succinic acids and arthydrides (e.g., succinic anhydride, dodecyl succinic anhydride and the like), fumaric acid, itaconic acid, maleic acid, maleic arthydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, and the like.

Since post-treating processes involving the use of these post-treating reagents is known insofar as application to high molecular weight nitrogen containing dispersants of the prior art, further descriptions of these processes herein is unnecessary. In order to apply the prior art processes to the compositions of this invention, all that is necessary is that reaction conditions, ratio of reactants, and the like as described in the prior art, be applied to the novel compositions of this invention. The following U.S. patents are expressly incorporated herein by reference for their disclosure of post-treating processes and post-treating reagents applicable to the compositions of this invention: U.S. Pat. Nos. 3,087,936; 3,200,107; 3,254,025; 3,256,185; 3,278,550; 3,281,428; 3,282,955; 3,284,410; 3,338,832; 3,344,069; 3,366,569; 3,373,111; 3,367,943; 3,403,102; 3,428,561; 3,502,677; 3,513,093; 3,533,945; 3,541,012; 3,639,242; 3,708,522; 3,859,318; 3,865,813; 3,470,098; 3,369,021; 3,184,411; 3,185,645; 3,245,908; 3,245,909; 3,245,910; 3,573,205; 3,692,681; 3,749,695; 3,865,740; 3,954,639; 3,458,530; 3,390,086; 3,367,943; 3,185,704; 3,551,466; 3,415,750; 3,312,619; 3,280,034; 3,718,663; 3,652,616; UK Pat. No. 1,085,903; UK Pat. No. 1,162,436; U.S. Pat. No. 3,558,743.

The nitrogen containing dispersant materials of this invention can also be treated with polymerizable lactones (such as epsilon-caprolactone) to form dispersant adducts having the moiety $-[C(O)(CH_2)_zO]_mH$, wherein z is a number of from 4 to 8 (e.g., 5 to 7) and m has an average value of from about 0 to 100 (e.g., 0.2 to 20). The dispersants of this invention can be post-treated with a $C_5$ to $C_9$ lactone, e.g., epsilon-caprolactone, by heating a mixture of the dispersant material and lactone in a reaction vessel in the absence of a solvent at a temperature of about 50° C. to about 200° C., more preferably from about 75° C. to about 180° C., and most preferably from about 90° C. to about 160° C., for a sufficient period of time to effect reaction. Optionally, a solvent for the lactone, dispersant material and/or the resulting adduct may be employed to control viscosity and/or the reaction rates.

In one preferred embodiment, the $C_5$ to $C_9$ lactone, e.g., epsilon-caprolactone, is reacted with a dispersant material in a 1:1 mole ratio of lactone dispersant material. In practice, the ration of lactone to dispersant material may vary considerably as a means of controlling the length of the sequence of the lactone units in the adduct. For example, the mole ratio of the lactone to the dispersant material may vary from about 10:1 to about 0.1:1, more preferably from about 5:1 to about 0.2:1, and most preferably from about 2:1 to about 0.4:1. It preferable to maintain the average degree of polymerization of the lactone monomer below about 100, with a degree of polymerization on the order of from about 0.2 to about 50 being preferred, and from about 0.2 to about 20 being more preferred. For optimum dispersant performance, sequences of from about 1 to about 5 lactone units in a row are preferred.

Catalysts useful in the promotion of the lactone-dispersant material reactions are selected from the group consisting of stannous octanoate, stannous hexanoate, tetrabutyl titanate, a variety of organic based acid catalysts and amine catalysts, as described on page 266, and forward, in a book chapter authored by R. D. Lundberg and E. F. Cox, entitled "Kinetics and Mechanisms of Polymerization: Ring Opening Polymerization", edited by Frisch and Reegen, published by Marcel Dekker in 1969, wherein stannous octanoate is an especially preferred catalyst. The catalyst is added to the reaction mixture at a concentration level of about 50 to about 10,000 parts per weight of catalyst per one million parts of the total reaction mixture.

The reactions of such lactones with dispersant materials containing nitrogen or ester groups is more completely described in copending applications Ser. Nos. 916,108; 916,217; 916,218; 916,287; 916,303; 916,113; and 916,114, all filed on Oct. 7, 1986; and co-pending Ser. No. 178,099 filed on Apr. 6, 1988; the disclosure of each of which is hereby incorporated by reference in its entirety.

The nitrogen-containing dispersant materials of this invention can also be post-treated by reaction with an alkyl acetoacetate or alkyl thioacetate of the formula:

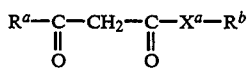

wherein $X^a$ is O or S, $R^b$ is H or $R^a$, and $R^a$ is in each instance in which it appears independently selected from the group consisting of substituted and unsubstituted alkyl or aryl (preferably alkyl of 1 to 6 carbon atoms, e.g., methyl, ethyl, etc.) to form an amino compound N-substituted by at least one tautomeric substituent of the formula:

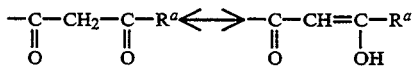

wherein $R^9$ is as defined above.

The reaction is preferably effected at a temperature sufficiently high so as to substantially minimize the production of the enaminone and produce, instead, the keto-enol tautomer. Temperatures of at least about 150° C. are preferred to meet this goal although proper choice of temperature depends on many factors, including reactants, concentration, reaction solvent choice, etc. Temperatures of from about 120° C. to 220° C., preferably from about 150° C. to 180° C. will generally be used. The reaction of the nitrogen-containing dispersant material and the alkyl acetonate and the alkyl thioacetate will liberate the corresponding $HOR^b$ and $HSR^b$ by-products, respectively. Preferably, such by-products are substantially removed, as by distilltion or stripping with an inert gas (such as $N_2$), prior to use of the thus prepared dispersant adduct. Such distillation and stripping steps are conveniently performed at elevated temperature, e.g., at the selected reaction temperature (for example, at 150° C. or higher). A neutral diluent such as mineral oil may be used for the reaction.

The amount of alkyl aceto-acetate and/or alkyl thioacetate reactants used can vary widely, and is preferably selected so as to avoid substantial excesses of these reactants. Generally, these reactants are used in a reactant: amine nitrogen-equivalent molar ratio of from about 0.1 to 1:1, and preferably from about 0.5 to 1:1, wherein the moles of amine nitrogen-equivalent is the moles of secondary nitrogens plus twice the moles of primary nitrogens in the nitrogen-containing dispersant material (e.g., polyisobutenyl succinimide) which is thus contacted with the alkylacetonate or alkyl thioacetate. The reaction should also be conducted in the substantial absence of strong acids (e.g., mineral acids, such as HCl, $HB_2$, $H_2SO_4$, $H_3PO_3$ and the like, and sulfonic acids, such as pare-toluene sulfonic acids) to avoid the undesired side-reactions and decrease in yield to the adducts of this invention.

The reactions of such alkyl acetoacetates and thioacetoacetates with nitrogen-containing dispersant materials is more completely described in copending application Ser. No. 51,276, filed May 18, 1987, the disclosure of which is hereby incorporated by reference in its entirety.

Further aspects of the present invention reside in the formation of metal complexes of the novel dispersant additives prepared in accordance with this invention. Suitable metal complexes may be formed in accordance with known techniques of employing a reactive metal ion species during or after the formation of the present dispersant materials. Complex forming metal reactants include the metal nitrates, thiocyanates, halides, carboxylates, phosphates, thio-phosphates, sulfates, and borates of transition metals such as iron, cobalt, nickel, copper, chromium, manganese, molybdenum, tungsten, ruthenium, palladium, platinum, cadmium, lead, silver, mercury, antimony and the like. Prior art disclosures of these complexing reactions may be also found in U.S. Pat. No. 3,306,908 and Re. 26,433, the disclosures of which are hereby incorporated by reference in their entirety.

The processes of these incorporated patents, as applied to the compositions of this invention, and the post-treated compositions thus produced constitute a further aspect of this invention.

The dispersants of the present invention can be incorporated into a lubricating oil in any convenient way. Thus, these mixtures can be added directly to the oil by dispersing or dissolving the same in the oil at the desired level of concentrations of the dispersant and detergent, respectively. Such blending into the additional lube oil can occur at room temperature or elevated temperatures. Alternatively, the dispersants can be blended with a suitable oil-soluble solvent and base oil to form a concentrate, and then blending the concentrate with a lubricating oil basestock to obtain the final formulation. Such dispersant concentrates will typically contain (on an active ingredient (A.I.) basis) from about 20 to about 60 wt. %, and preferably from about 40 to about 50 wt. %, dispersant additive, and typically from about 40 to 80 wt. %, preferably from about 40 to 60 wt. %, base oil, based on the concentrate weight.

The lubricating oil basestock for the dispersant typically is adapted to perform a selected function by the incorporation of additional additives therein to form lubricating oil compositions (i.e., formulations).

LUBRICATING

Lubricating oil compositions, e.g. automatic transmission fluids, heavy duty oils suitable for gasoline and diesel engines, etc., can be prepared with the additives of the invention. Universal type crankcase oils wherein the same lubricating oil compositions can be used for both gasoline and diesel engine can also be prepared. These lubricating oil formulations conventionally contain several different types of additives that will supply the characteristics that are required in the formulations. Among these types of additives are included viscosity index improvers, antioxidants, corrosion inhibitors, detergents, dispersants, pour point depressants, antiwear agents, etc.

In the preparation of lubricating oil formulations it is common practice to introduce the additives in the form of 10 to 80 wt. %, e.g. 20 to 80 wt. % active ingredient concentrates in hydrocarbon oil, e.g. mineral lubricating oil, or other suitable solvent. Usually these concentrates may be diluted with 3 to 100, e.g. 5 to 40 parts by weight of lubricating oil, per part by weight of the additive package, in forming finished lubricants, e.g. crankcase motor oils. The purpose of concentrates, of course, is to make the handling of the various materials less difficult and awkward as well as to facilitate solution or dispersion in the final blend. Thus, a dispersant would be usually employed in the form of a 40 to 50 wt. % concentrate, for example, in a lubricating oil fraction.

The ashless dispersants of the present invention will be generally used in admixture with a lube oil basestock, comprising an oil of lubricating viscosity, including natural and synthetic lubricating oils and mixtures thereof.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, the alkyl and aryl ethers of these polyoxyalkylene polymers (e.g., methyl-poly isopropylene glycol ether having an average molecular weight of 1000, diphenyl ether of poly-ethylene glycol having a molecular weight of 500–1000, diethyl ether of polypropylene glycol having a molecular weight of 1000–1500); and mono- and polycarboxylic esters thereof, for example, the acetic acid esters, mixed $C_3$–$C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl)sebacate, di-n-hexyl rumarete, dioctyl sebacate, diisooctyl azelate, diisodecyl azslate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxane oils and silicate oils comprise another useful class of synthetic lubricants; they include tetraethyl silicate, tetraisopropyl silicate, tetra-(2-ethylhexyl) silicate, tetra-(4-methyl-2-ethylhexyl)silicate, tetra-(p-tertbutylphenyl)silicate, hexa-(4-methyl-2-pentoxy)disiloxane, poly(methyl)siloxanes and poly(methylphenyl) siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or eater oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

Metal containing rust inhibitors and/or detergents are frequently used with ashless dispersants. Such detergents and rust inhibitors include the metal salts of sulphonic acids, alkyl phenols, sulphurized alkyl phenols, alkyl salicylates, naphthenates, and other oil soluble mono- and di-carboxylic acids. Highly basic, that is overbased metal salts which are frequently used as detergents appear particularly prone to interaction with the ashless dispersant. Usually these metal containing rust inhibitors and detergents are used in lubricating oil in amounts of about 0.01 to 10, e.g. 0.1 to 5 wt. %, based on the weight of the total lubricating composition. Marine diesel lubricating oils typically employ such metal-containing rust inhibitors and detergents in amounts of up to about 20 wt. %.

Highly basic alkaline earth metal sulfonates are frequently used as detergents. They are usually produced by heating a mixture comprising an oil-soluble sulfonate or alkaryl sulfonic acid, with an excess of alkaline earth metal compound above that required for complete neutralization of any sulfonic acid present and thereafter forming a dispersed carbonate complex by reacting the excess metal with carbon dioxide to provide the desired overbasing. The sulfonic acids are typically obtained by the sulfonation of alkyl substituted aromatic hydrocarbons such as those obtained from the fractionation of petroleum by distillation and/or extraction or by the alkylation of aromatic hydrocarbons as for example those obtained by alkylating benzene, toluene, xylene, naphthalene, diphenyl and the halogen derivatives such as chlorobenzene, chlorotoluene and chloronaphthalene. The alkylation may be carried out in the presence of a catalyst with alkylating agents having from about 3 to more than 30 carbon atoms. For example haloparaffins, olefins obtained by dehydrogenation of paraffins, polyolefins produced from. ethylene, propylene, etc. are all suitable. The alkaryl sulfonates usually contain from about 9 to about 70 or more carbon atoms, preferably from about 16 to about 50 carbon atoms per alkyl substituted aromatic moiety.

The alkaline earth metal compounds which may be used in neutralizing these alkaryl sulfonic acids to provide the sulfonates includes the oxides and hydroxides, alkoxides, carbonates, carboxylate, sulfide, hydrosulfide, nitrate, borates and ethers of magnesium, calcium, and barium. Examples are calcium oxide, calcium hydroxide, magnesium acetate and magnesium borate. As noted, the alkaline earth metal compound is used in excess of that required to complete neutralization of the alkaryl sulfonic acids. Generally, the amount ranges from about 100 to 220%, although it is preferred to use at least 125%, of the stoichiometric amount of metal required for complete neutralization.

Various other preparations of basic alkaline earth metal alkaryl sulfonates are known, such as U.S. Pat. Nos. 3,150,088 and 3,150,089 wherein overbasing is accomplished by hydrolysis of an alkoxide-carbonate complex with the alkaryl sulfonate in a hydrocarbon solvent-diluent oil.

A preferred alkaline earth sulfonate additive is magnesium alkyl aromatic sulfonate having a total base number ranging from about 300 to about 400 with the magnesium sulfonate content ranging from about 25 to about 3 wt. %, based upon the total weight of the additive system dispersed in mineral lubricating oil.

Neutral metal sulfonates are frequently used as rust inhibitors. Polyvalent metal alkyl salicylate and naphthenate materials are known additives for lubricating oil compositions to improve their high temperature performance and to counteract deposition of carbonaceous matter on pistons (U.S. Pat. No. 2,744,069). An increase in reserve basicity of the polyvalent metal alkyl salicylates and naphthenates can be realized by utilizing alkaline earth metal, e.g. calcium, salts of mixtures of alkyl salicylates and phenates (see U.S. Pat. No. 2,744,069) or polyvalent metal salts of alkyl salicyclic acids, said acids obtained from the alkylation of phenols followed phenation, carboxylation and hydrolysis (U.S. Pat. No. 3,704,315) which could then be converted into highly basic salts by techniques generally known and used for such conversion. The reserve basicity of these metal-containing rust inhibitors is usefully at TBN levels of between about 60 and 150. Included with the useful polyvalent metal salicylate and naphthenate materials are the methylene and sulfur bridged materials which are readily derived from alkyl substituted salicylic or naphthenic acids or mixtures of either or both with alkyl substituted phenols. Basic sulfurized salicylates and a method for their preparation is shown in U.S. Pat. No. 3,595,791. Such materials include alkaline earth metal, particularly magnesium, calcium, strontium and barium salts of aromatic acids having the general formula:

$$HOOC-ArR_1-X_y(ArR_1OH)_n \qquad (XXXV)$$

where Ar is an aryl radical of 1 to 6 rings, $R_1$ is an alkyl group having from about 8 to 50 carbon atoms, preferably 12 to 30 carbon atoms (optimally about a sulfur (—S—) or methylene (—CH$_2$—) bridge, y is a number from 0 to 4 and n is a number from 0 to 4.

Preparation of the overbased methylene bridged salicylate-phenate salt is readily carried out by conventional techniques such as by alkylation of a phenol followed by phenation, carboxylation, hydrolysis, methylene bridging a coupling agent such as an alkylene dihalide followed by salt formation concurrent with carbonation. An overbased calcium salt of a methylene bridged phenol-salicylic acid of the general formula (XXXVI):

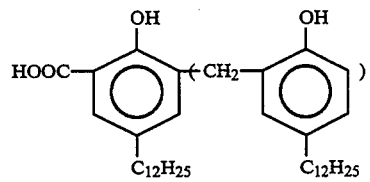

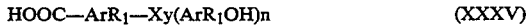

with a TBN of 60 to 150 is highly useful in this invention.

The sulfurs led metal phenates can be considered the "metal salt of a phenol sulfide" which thus refers to a metal salt whether neutral or basic, of a compound typified by the general formula (XXXVII):

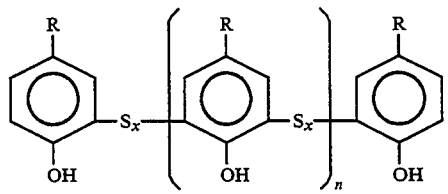

where x=1 or 2, n=0, 1 or 2; or a polymeric form of such a compound, where R is an alkyl radical, n and x are each integers from 1 to 4, and the average number of carbon atoms in all of the R groups is at least about 9 in order to ensure adequate solubility in oil. The individual R groups may each contain from 5 to 40, preferably 8 to 20, carbon atoms. The metal salt is prepared by reacting an alkyl phenol sulfide with a sufficient quantity of metal containing material to impart the desired alkalinity to the sulfurized metal phenate.

Regardless of the manner in which they are prepared, the sulfurized alkyl phenols which are useful generally contain from about 2 to about 14% by weight, preferably about 4 to about 12 wt. % sulfur based on the weight of sulfurized alkyl phenol.

The sulfurized alkyl phenol may be converted by reaction with a metal containing material including oxides, hydroxides and complexes in an amount sufficient to neutralize said phenol and, if desired, to overbase the product to a desired alkalinity by procedures well known in the art. Preferred is a process of neutralization utilizing a solution of metal in a glycol ether.

The neutral or normal sulfurized metal phenates are those in which the ratio of metal to phenol nucleus is about 1:2. The "overbased" or "basic" sulfurized metal phenates are sulfurized metal phenates wherein the ratio of metal to phenol is greater than that of stoichiometric, e.g. basic sulfurized metal dodecyl phenate has a metal content up to and greater than 100% in excess of the metal present in the corresponding normal sulfurized metal phenates wherein the excess metal is produced in oil-soluble or dispersible form (as by reaction with $CO_2$).

Magnesium and calcium containing additives although beneficial in other respects can increase the tendency of the lubricating oil to oxidize. This is especially true of the highly basic sulphonates.

According to a preferred embodiment the invention therefore provides a crankcase lubricating composition also containing from 2 to 8000 parts per million of calcium or magnesium.

The magnesium and/or calcium is generally present as basic or neutral detergents such as the sulphonates and phenates, our preferred additives are the neutral or basic magnesium or calcium sulphonates. Preferably the oils contain from 500 to 5000 parts per million of calcium or magnesium. Basic magnesium and calcium sulphonates are preferred.

As indicated earlier, a particular advantage of the novel dispersants of the present invention is use with V.I improvers to form multi-grade automobile engine lubricating oils. Viscosity modifiers impart high and low temperature operability to the lubricating oil and permit it to remain relatively viscous at elevated temperatures and also exhibit acceptable viscosity or fluidity at low temperatures. Viscosity modifiers are generally high molecular weight hydrocarbon polymers including polyesters. The viscosity modifiers may also be derivatized to include other properties or functions, such as the addition of dispersancy properties. These oil soluble viscosity modifying polymers will generally have number average molecular weights of from $10^3$ to $10^6$, preferably $10^4$ to $10^6$, e.g., 20,000 to 250,000, as determined by gel permeation chromatography or osmometry.

Examples of suitable hydrocarbon polymers include homopolymers and copolymers of two or more monomers of $C_2$ to $C_{30}$, e.g. $C_2$ to $C_8$ olefins, including both alpha olefins and internal olefins, which may be straight or branched, aliphatic, aromatic, alkyl-aromatic, cycloaliphatic, etc. Frequently they will be of ethylene with $C_3$ to $C_{30}$ olefins, particularly preferred being the copolymers of ethylene and propylene. Other polymers can be used such as polyisobutylenes, homopolymers and copolymers of $C_6$ and higher alpha olefins, atactic polypropylene, hydrogenated polymers and copolymers and terpolymers of styrene, e.g. with isoprene and/or butadiene and hydrogenated derivatives thereof. The polymer may be degraded in molecular weight, for example by mastication, extrusion, oxidation or thermal degradation, and it may be oxidized and contain oxygen. Also included are derivatized polymers such as post-grafted interpolymers of ethylene-propylene with an active monomer such as maleic anhydride which may be further reacted with an alcohol, or amine, e.g. an alkylene polyamine or hydroxy amine, e.g. see U.S. Pat. Nos. 4,089,7945 4,160,739, 4,137,185; or copolymers of ethylene and propylene reacted or grafted with nitrogen compounds such as shown in U.S. Pat. Nos. 4,068,056; 4,068,058; 4,146,489 and 4,149,984.

The preferred hydrocarbon polymers are ethylene copolymers containing from 15 to 90 wt. % ethylene, preferably 30 to 80 wt. % of ethylene and preferably 2 0 to 7 0 wt. % of one or more $C_3$ to $C_{28}$, preferably $C_3$ to $C_{18}$, more preferably $C_3$ to $C_8$, alpha-olefins. While not essential, such copolymers preferably have a degree of crystallinity of less than 25 wt. %, as determined by X-ray and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentene-1, 4,4-dimethyl-l-pentene, and 6-methylheptene-1, etc., and mixtures thereof.

Terpolymers, tetrapolymers, etc., of ethylene, said $C_{3-28}$ alpha-olefin, and a non-conjugated diolefin or mixtures of such diolefins may also be used. The amount of the non-conjugated diolefin generally ranges from about 0.5 to 20 mole percent, preferably from about 1 to about 7 mole percent, based on the total amount of ethylene and alpha-olefin present.

The polyester V.I. improvers are generally polymers of esters of ethylenically unsaturated $C_3$ to $C_8$ mono- and dicarboxylic acids such as sethacrylic and acrylic acids, realsic acid, maleic anhydride, fumaric acid, etc.

Examples of unsaturated esters that may be used include those of aliphatic saturated mono alcohols of at least 1 carbon atom and preferably of from 12 to 20 carbon atoms, such as decyl acrylate, lauryl acrylate, stearyl acrylate, eicosanyl acrylate, docosanyl acrylate, decyl methacrylate, diamyl fumarate, lauryl methacrylate, cetyl methacrylate, stearyl methacrylate, and the like and mixtures thereof.

Other esters include the vinyl alcohol esters of $C_2$ to $C_{22}$ fatty or mono carboxylic acids, preferably saturated such as vinyl acetate, vinyl laurate, vinyl palmitate, vinyl stearate, vinyl oleate, and the like and mixtures thereof. Copolymers of vinyl alcohol esters with unsaturated acid esters such as the copolymer of vinyl acetate with dialkyl fumarates, can also be used.

The esters may be copolymerized with still other unsaturated monomers such as olefins, e.g. 0.2 to 5 moles of $C_{2-C20}$ aliphatic or aromatic olefin per mole of unsaturated ester, or per mole of unsaturated acid or anhydride followed by esterification. For example. copolymers of styrene with maleic anhydride esterified with alcohols and amines are known, e.g., see U.S. Pat. No. 3,702,300.

Such ester polymers may be grafted with, or the ester copolymerized with, polymerizable unsaturated nitrogen-containing monomers to impart dispersancy to the V.I. improvers. Examples of suitable unsaturated nitrogen-containing monomers include those containing 4 to 20 carbon atoms such as amino substituted olefins as p-(beta-diethylaminoethyl) styrene; basic nitrogen containing heterocycles carrying a polymerizable ethylenically unsaturated substituent, e.g. the vinyl pyridines and the vinyl alkyl pyridines such as 2-vinyl-5-ethyl pyridine, 2-methyl-5-vinyl pyridine, 2-vinyl-pyridine, 4-vinylpyridine, 3-vinyl-pyridine, 3-methyl-5-vinyl-pyridine, 4-methyl-2-vinyl-pyridine. 4-ethyl-2-vinyl-pyridine and 2-butyl-l-5-vinyl-pyridine and the like.

N-vinyl lactams are also suitable, e.g. N-vinyl pyrrolidones or N-vinyl piperidones.

The vinyl pyrrolidones are preferred and are exemplified by N-vinyl pyrrolidone, N-(1-methylvinyl) pyrrolidone, N-vinyl-5-methyl pyrrolidone, N-vinyl-3, 3-dimethylpyrrolidone, N-vinyl-5-ethyl pyrrolidone, etc.

Dihydrocarbyl dithiophosphate metal salts are frequently used as anti-wear agents and also provide antioxidant activity. The zinc salts are most commonly used in lubricating oil in amounts of 0.1 to 10, preferably 0.2 to 2 wt. %, based upon the total weight of the lubricating oil composition. They may be prepared in accordance with known techniques by first forming a dithiophosphoric acid, usually by reaction of an alcohol or a phenol with $P_2S_5$ and then neutralizing the dithiophosphoric acid with a suitable zinc compound.

Mixtures of alcohols may be used including mixtures of primary and secondary alcohols, secondary generally for imparting improved anti-wear properties, with primary giving improved thermal stability properties. Mixtures of the two are particularly useful. In general, any basic or neutral zinc compound could be used but the oxides, hydroxides and carbonates are most generally employed. Commercial additives frequently contain an excess of zinc due to use of an excess of the basic zinc compound in the neutralization reaction.

The zinc dihydrocarbyl dithiophosphates useful in the present invention are oil soluble salts of dihydrocarbyl esters of dithiophosphoric acids and may be represented by the following formula:

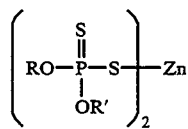
(XXXVIII)

wherein R and R' may be the same or different hydrocarbyl radicals containing from 1 to 18, preferably 2 to 12 carbon atoms and including radicals such as alkyl, alkenyl, aryl, aralkyl, alkaryl and cycloaliphatic radicals. Particularly preferred as R and R' groups are alkyl groups of carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl etc. In order to obtain oil solubility, the total number of carbon atoms (i.e., R and R' in formula XXXVIII) in the dithiophosphoric acid will generally be about 5 or greater.

The antioxidants useful in this invention include oil soluble copper compounds. The copper may be blended into the oil as any suitable oil soluble copper compound. By oil soluble we mean the compound is oil soluble under normal blending conditions in the oil or additive package. The copper compound may be in the cuprous or cuptic form. The copper may be in the form of the copper dihydrocarbyl thio- or dithio-phosphates wherein copper may be substituted for zinc in the compounds and reactions described above although one mole of cuprous or cuptic oxide may be reacted with one or two moles of the dithiophosphoric acid, respectively. Alternatively the copper may be added as the copper salt of a synthetic or natural carboxylic acid. Examples include $C_{10}$ to $C_{18}$ fatty acids such as stearic or palmitic, but unsaturated acids such as oleic or branched carboxylic acids such as napthenic acids of molecular weight from 200 to 500 or synthetic carboxylic acids are preferred because of the improved handling and solubility properties of the resulting copper carboxylates. Also useful are oil soluble copper dithiocarbamates of the general formula $(RR'NCSS)_nCu$, where n is 1 or 2 and R and R' are the same or different hydrocarbyl radicals containing from 1 to 18 and preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e, R and R') will generally be about 5 or greater. Copper sulphonates, phenates, and acetylacetonates may also be used.

Exemplary of useful copper compounds are copper ($Cu^I$ and/or $Cu^{II}$) salts of alkenyl succinic acids or anhydrides. The salts themselves may be basic, neutral or acidic. They may be formed by reacting (a) any of the materials discussed above in the Ashless Dispersant section, which have at least one free carboxylic acid (or anhydride) group with (b) a reactive metal compound. Suitable acid (or anhydride) reactive metal compounds include those such as cupric or cuprous hydroxides, oxides, acetates, borates, and carbonates or basic copper carbonate.

Examples of the metal salts of this invention are Cu salts of polyisobutenyl succinic anhydride (hereinafter referred to as Cu-PIBSA), and Cu salts of polyisobutenyl succinic acid. Preferably, the selected metal employed is its divalent form, e.g., $Cu^{+2}$. The preferred substrates are polyalkenyl succinic acids in which the alkenyl group has a molecular weight greater than about 700. The alkenyl group desirably has a $M_n$ from about 900 to 1400, and up to 2500, with a $M_n$ of about 950 being most preferred. Especially preferred, of those listed above in the section on Dispersants, is polyisobutylene succinic acid (PIBSA). These materials may desirably be dissolved in a solvent, such as a mineral oil, and heated in the presence of a water solution (or slurry) of the metal bearing material. Heating may take place between 70° and about 200° C. Temperatures of 110° to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-PIBSA, Cu-oleate, or mixtures thereof) will be generally employed in an amount of from about 50–500 ppm by weight of the metal, in the final lubricating or fuel composition.

The copper antioxidants used in this invention are inexpensive and are effective at low concentrations and therefore do not add substantially to the cost of the product. The results obtained are frequently better than those obtained with previously used antioxidants, which are expensive and used in higher concentrations. In the amounts employed, the copper compounds do not interfere with the performance of other components of the lubricating composition, in many instances, completely satisfactory results are obtained when the copper compound is the sole antioxidant in addition to the ZDDP. The copper compounds can be utilized to replace part or all of the need for supplementary antioxidants. Thus, for particularly severe conditions it may be desirable to include a supplementary, conventional antioxidant. However, the amounts of supplementary antioxidant required are small, far less than the amount required in the absence of the copper compound.

While any effective amount of the copper antioxidant can be incorporated into the lubricating oil composition, it is contemplated that such effective amounts be sufficient to provide said lube oil composition with an amount of the copper antioxidant of from about 5 to 500 (more preferably 10 to 200, still more preferably 10 to 180, and most preferably 20 to 130 (e.g. , 90 to 120) ) part per million of added copper based on the weight of the lubricating oil composition. Of course, the preferred amount may depend amongst other factors on the quality of the basestock lubricating oil.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 weight percent of a sulfide of phosphorus for ½ to 15 hours, at a temperature in the range of 65° to 315° C. Neutralization of the phosphosulfurized hydrocarbon may be effected in the manner taught in U.S. Pat. No. 1,969,324.

Oxidation inhibitors reduce the tendency of mineral oils to deteriorate in service which deterioration can be evidenced by the products of oxidation such as sludge and varnish-like deposits on the metal surfaces and by viscosity growth. Such oxidation inhibitors include alkaline earth metal salts of alkylphenolthioesters having preferably $C_5$ to $C_{12}$ alkyl side chains, calcium nonylphenol sulfide, barium t-octylphenyl sulfide, dioctylphenylamine, phenylalphanaphthylamine, phosphosulfurized or sulfurized hydrocarbons, etc.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,57 1 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide U.S. Pat. No. 3,852,205 which discloses S-carboxy-alkylene hydrocarbyl succinimide, S-carboxyalkylene hydrocarbyl succinamic acid and mixtures thereof; U.S. Pat. No. 3,879,306 which discloses N-(hydroxyalkyl alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are glycerol mono and dioleates, and succinate esters, or metal salts thereof, of hydrocarbyl substituted succinic acids or anhydrides and thiobis alkanols such as described in U.S. Pat. No. 4,344,853.

Pour point depressants lower the temperature at which the fluid will flow or can be poured. Such depressants are well known. Typical of those additives which usefully optimize the low temperature fluidity of the fluid are $C_8$–$C_{18}$ dialkylfumarate vinyl acetate copolymers, polymethacrylates, and wax naphthalene. Foam control can be provided by an antifoamant of the polysiloxane type, e.g. silicone oil and polydimethyl siloxane.

Organic, oil-soluble compounds useful as rust inhibitors in this invention comprise nonionic surfactants such as polyoxyalkylene polyols and esters thereof, and anionic surfactants such as salts of alkyl sulfonic acids. Such anti-rust compounds are known and can be made by conventional means. Nonionic surfactants, useful as anti-rust additives in the oleaginous compositions of this invention, usually owe their surfactant properties to a number of weak stabilizing groups such as ether linkages. Nonionic anti-met agents containing ether linkages can be made by alkoxylating organic substrates containing active hydrogens with an excess of the lower alkylene oxides (such as ethylene and propylene oxides) until the desired number of alkoxy groups have been placed in the molecule.

The preferred met inhibitors are polyoxyalkylene polyols and derivatives thereof. This class of materials are commercially available from various sources: Pluronic Polyols from Wyandotte Chemicals Corporation; Polyglycol 112-2, a liquid triol derived from ethylene oxide and propylene oxide available from Dow Chemical Co.; and Tergitol, dodecylphenyl or monophenyl polyethylene glycol ethers, and Ucon, polyalkylene glycols and derivatives, both available from Union Carbide Corp. These are but a few of the commercial products suitable as rust inhibitors in the improved composition of the present invention.

In addition to the polyols per se, the esters thereof obtained by reacting the polyols with various carboxylic acids are also suitable. Acids useful in preparing these esters are lauric acid, stearic acid, succinic acid, and alkyl- or alkenyl-substituted succinic acids where in the alkyl-or alkenyl group contains up to about twenty carbon atoms. The preferred polyols are prepared as block polymers. Thus, a hydroxy-substituted compound, R—(OH)n (wherein n is 1 to 6, and R is the residue of a mono- or polyhydric alcohol, phenol, naphthol, etc.) is reacted with propylene oxide to form a hydrophobic base. This base is then reacted with ethylene oxide to provide a hydrophylic portion resulting in a molecule having both hydrophobic and hydrophylic portions. The relative sizes of these portions can be adjusted by regulating the ratio of reactants, time of reaction, etc., as is obvious to those skilled in the art. Thus it is within the skill of the art to prepare polyols whose molecules are characterized by hydrophobic and hydrophylic moieties which are present in a ratio rendering rust inhibitors suitable for use in any lubricant composition regardless of differences in the base oils and the presence of other additives.

If more oil-solubility is needed in a given lubricating composition, the hydrophobic portion can be increased and/or the hydrophylic portion decreased- If greater oil-in-water emulsion breaking ability is required, the hydrophylic and/or hydrophobic portions can be adjusted to accomplish this.

Compounds illustrative of R—(OH)n include alkylene polyols such as the alkylene glycols, alkylene triols, alkylene tetrols, etc., such as ethylene glycol, propylene glycol, glycerol, pentaerythritol, sorbitol, mannitol, and the like. Aromatic hydroxy compounds such as alkylated mono- and polyhydric phenols and naphthols can also be used, e.g., heptylphenol, dodecylphenol, etc.

Other suitable demulsifiers include the esters disclosed in U.S. Pat. Nos. 3,098,827 and 2,674,619.

The liquid polyols available from Wyandotte Chemical Co. under the name Pluronic Polyols and other similar polyols are particularly well suited as rust inhibitors. These Pluronic Polyols correspond to the formula:

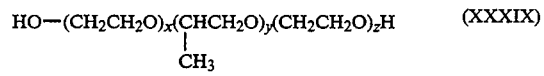
(XXXIX)

wherein x, y, and z are integers greater than 1 such that the —$CH_2CH_2O$— groups comprise from about 10% to about 40% by weight of the total molecular weight of the glycol, the average molecule weight of said glycol being from about 1000 to about 5000. These products are prepared by first condensing propylene oxide with propylene glycol to produce the hydrophobic base $$HO(-\underset{\underset{CH_3}{|}}{CH}-CH_2-O)_y-H \qquad (XVIII)$$

This condensation product is then treated with ethylene oxide to add hydrophylic portions to both ends of the molecule. For best results, the ethylene oxide units should comprise from about 10 to about 40% by weight of the molecule. Those products wherein the molecular weight of the polyol is from about 2500 to 4500 and the ethylene oxide units comprise from about 10% to about 15% by weight of the molecule are particularly suitable. The polyols having a molecular weight of about 4000 with about 10% attributable to ($CH_2CH_2O$) units are particularly good. Also useful are alkoxylated fatty amines, amides, alcohols and the like, including such alkoxylated fatty acid derivatives treated with $C_9$ to $C_{16}$ alkyl-substituted phenols (such as the mono- and di-heptyl, octyl, nonyl, decyl, undecyl, dodecyl and tridecyl phenols), as described in U.S. Pat. No. 3,849,501, which is also hereby incorporated by reference in its entirety.

These compositions of our invention may also contain other additives such as those previously described, and other metal containing additives, for example, those containing barium and sodium.

The lubricating composition of the present invention may also include copper lead bearing corrosion inhibitors. Typically such compounds are the thiadiazole polysulphides containing from 5 to 50 carbon atoms, their derivatives and polymers thereof. Preferred materials are the derivatives of 1,3,4-thiadiazoles such as those described in U.S. Pat. Nos. 2,719,125; 2,719,126; and 3,087,932; especially preferred is the compound 2,5 bis (t-octadithio)-1,3,4-thiadiazole commercially available as Amoco 150. Other similar materials also suitable are described in U.S. Pat. Nos. 3,821,236; 3,904,537; 4,097,387; 4,107,059; 4,136,043; 4,188,299; and 4,193,882.

Other suitable additives are the thio and polythio sulphenamides of thiadiazoles such as those described in U.K. Patent Specification 1,560,830. When these compounds are included in the lubricating composition, we prefer that they be present in an amount from 0.01 to 10, preferably 0.1 to 5.0 weight percent based on the weight of the composition.

Some of these numerous additives can provide a multiplicity of effects, e.g. a dispersant-oxidation inhibitor. This approach is well known and need not be further elaborated herein.

Compositions when containing these conventional additives are typically blended into the base oil in amounts effective to provide their normal attendant function. Representative effective amounts of such additives (as the respective active ingredients) in the fully formulated oil are illustrated as follows:

| Compositions | Wt. % A.I. (Preferred) | Wt. % A.I. (Broad) |
|---|---|---|
| Viscosity Modifier | .01–4 | 0.01–12 |
| Detergents | 0.01–3 | 0.01–20 |
| Corrosion Inhibitor | 0.01–1.5 | .01–5 |
| Oxidation Inhibitor | 0.01–1.5 | .01–5 |
| Dispersant | 0.1–8 | .1–20 |

-continued

| Compositions | Wt. % A.I. (Preferred) | Wt. % A.I. (Broad) |
|---|---|---|
| Pour Point Depressant | 0.01–1.5 | .01–5 |
| Anti-Foaming Agents | 0.001–0.15 | .001–3 |
| Anti-Wear Agents | 0.001–1.5 | .001–5 |
| Friction Modifiers | 0.01–1.5 | .01–5 |
| Mineral Oil Base | Balance | Balance |

When other additives are employed, it may be desirable, although not necessary, to prepare additive concentrates comprising concentrated solutions or dispersions of the novel dispersants of this invention concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the dispersants of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 about 60% by weight additives in the appropriate proportions with the remainder being base oil.

The final formulations may employ typically about 10 wt. % of the additive-package with the remainder being base oil.

All of said weight percents expressed herein (unless otherwise indicated) are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all parts are parts by weight, unless otherwise noted and which include preferred embodiments of the invention.

Preparation of Polyisobutylene Succinic Anhydride

EXAMPLE 1

A polyisobutenyl succinic anhydride (PIBSA) having a succinic anhydride (SA): PIB ratio of about 1.1 is prepared by heating a mixture of 100 parts of polyisobutylene (PIB) (about 2000 $\overline{M}_n$; $\overline{M}_w/\overline{MHD}$ n~2.5) with 6.1 parts of realsic arthydride to a temperature of about 220° C. When the temperature reaches 120° C., the chlorine addition is begun and 5.1 parts of chlorine at a constant rate are added to the hot mixture for about 5.5 hours. The reaction mixture is then heat soaked at 220° C. for about 1.5 hours and then stripped with nitrogen for about one hour. The resulting polyisobutenyl succinic arthydride has an ASTM Saponification Number of 54, and a kinematic viscosity (100° C.) of 4000 cSt. The PIBSA product is 80 wt. % active ingredient (A.I.), the remainder being primarily unfunctionalized PIB.

Preparation of Dispersant

A series of dispersants are prepared by reacting the PIBSA prepared in Example 1 above.

The amination reactions are carried out as follows:

COMPARATIVE EXAMPLE 2–Preparation of PIBSA-PAM

A mixture of 100 parts of the PIBSA starting material of Example 1, and 60 parts of mineral oil is heated to 150° C. Then 5 parts of a commercially available polyalkylene polyamine comprising a polyethylene polyamine (having an average of about 6 nitrogen atoms and an average of about 10 carbon atoms per molecule) are added dropwise while stirring. The mixture is nitrogen stripped at 150° C. for 1 hour and then filtered to provide the polyisobutenyl succinimide product (PIBSA-PAM). The oil solution is found to contain 1 wt.% nitrogen and to have a viscosity of 700 cSt. at 100° C.

COMPARATIVE EXAMPLE 3–Preparation of Thiol-Modified PISBA-PAM

A 300 parts portion of the PIBSA-PAM product of Comparative Example 2 and 2.4 parts of 2,3-epoxy-1-propanethiol are admixed and heated to 140° C. for 5 hours, with continuous stirring under an air-cooled condenser. The condenser is then removed and the product sparged with $N_2$ for 1 hr. at 160° C. and filtered. The resulting oil solution has a viscosity of 850 cSt at 100° C.

EXAMPLE 4–Preparation of PIBSA-Thiol-Polyamine Adduct

A. 100 parts of the PIBSA product prepared in Example 1, 60 parts of oil and 3.6 parts of 2,3-epoxy-1-propanethiol are reacted at 80° C. for 4½ hours with stirring and then for 7½ hours at 120° C. Thereafter, the reaction mass is heated to 150° C. and stripped with $N_2$ for ½ hour. The resulting product solution containing the PIBSA-2,3-epoxy-1-propanethiol hemi-thioester is cooled to 120° C., and 5 parts of the same alkylene polyamine as used in Comparative Example 2 is added. After ½ hour at 120° C., the mixture is $N_2$ stripped at 150° C. for ½ hour and then filtered. The resulting oil solution is found to contain the desired PIBSA-2,3-epoxy-1-propanethiol-PAM adduct and to have a viscosity of 1070 cSt at 100° C.

EXAMPLE 5–Preparation of PIBSA-Thiol-Polyamine Adduct

The procedure of Example 4 was repeated except that the PIBSA/2,3-epoxy-1-propanethiol mixture is reacted at 80° C. for only 3 hours (with stirring) before increasing the temperature to 120° C., and 2.5 parts of 2,3-epoxy-1-propanethiol is used instead of the 3.6 parts of Example 4.

The following lubricating oil compositions are prepared using the dispersants of Examples 4–5, and Comparative Examples 2–3. The resulting compositions are then tested for sludge inhibition (via the SIB test) and varnish inhibition (via the VIB test), as described below.

The SIB test has been found, after a large number of evaluations, to be an excellent test for assessing the dispersing power of lubricating oil dispersant additives.

The medium chosen for the SIB test is a used crankcase mineral lubricating oil composition having an original viscosity of about 325 SUS at 38° C. that has been used in a taxicab that was driven generally for short trips only, thereby causing a buildup of a high concentration of sludge precursors. The oil that is used contains only a refined base mineral lubricating oil, a viscosity index improver, a pour point depressant and zinc dialkyldithiophosphate anti-wear additive. The oil contains no sludge dispersant. A quantity of such used oil is acquired by draining and refilling the taxicab crankcase at 1000–2000 mile intervals.

The SIB test is conducted in the following manner: the aforesaid used crankcase oil, which is milky brown in color, is freed of sludge by centrifuging for one hour at about 39,000 gravities (gs.). The resulting clear bright red supernatant oil is then decanted from the insoluble sludge particles thereby separated out. However, the supernatant oil still contains oil-soluble sludge precursors which on heating under the conditions employed by this test will tend to form additional oil-insoluble deposits of sludge. The sludge inhibiting properties of the additives being tested are determined by adding to portions of the supernatant used oil, a small amount, such as 0.5, 1 or 2 weight percent, of the particular additive being tested. Ten grams of each blend being tested are placed in a stainless steel centrifuge tube and are heated at 135° C. for 16 hours in the presence of air. Following the heating, the tube containing the oil being tested is cooled and then centrifuged for about 30 minutes at room temperature at about 39,000 gs. Any deposits of new sludge that form in this step are separated from the oil by decanting the supernatant oil and then carefully washing the sludge deposits with 25 ml of heptane to remove all remaining oil from the sludge and further centrifuging. The weight of the new solid sludge that has been formed in the test, in milligrams, is determined by drying the residue and weighing it. The results are reported as amount of precipitated sludge in comparison with the precipitated sludge of a blank not containing any additional additive, which blank is normalized to a farina of 10. The less new sludge precipitated in the presence of the additive, the lower the SIB value and the more effective is the additive as a sludge dispersant. In other words, if the additive gives half as much precipitated sludge as the blank, then it would be rated 5.0 since the blank will be normalized to 10.

The VIB test is used to determine varnish inhibition. Here, each test sample consists of 10 grams of lubricating oil containing a small amount of the additive being tested. The test oil to which the additive is admixed is of the same type as used in the above-described SIB test. Each ten gram sample is heat soaked overnight at about 140° C. and is thereafter centrifuged to remove the sludge. The supernatant fluid of each sample is subjected to heat cycling from about 150° C. to room temperature over a period of 3.5 hours at a frequency of about 2 cycles per minute. During the heating phase, gas which is a mixture of about 0.7 volume percent $SO_2$, 1.4 volume percent NO and balance air is bubbled through the test samples. During the cooling phase, water vapor is bubbled through the test samples. At the end of the test period, which testing cycle can be repeated as necessary to determine the inhibiting effect of any additive, the wall surfaces of the test flasks in which the samples were contained are visually evaluated as to the varnish inhibition. The amount of varnish imposed on the walls is rated to values of from 1 to 11 with the higher number being the greater amount of varnish, in comparison with a blank with no additive that was rated 11.

10.00 grams of SIB test oil were mixed with 0.05 grams of the products of the Examples as described in Table II and tested in the aforedescribed SIB and VIB tests.

The test results are summarized below in Table I. The compounds of this invention, Examples 4 and 5, clearly show superior sludge and varnish handling characteristics relative to the PIBSA-PAM dispersant (Runs 1–2) and the PIBSA-PAM dispersant subsequently modified with monoepoxy thiol (Runs 3–4).

TABLE I

| Run No. | Dispersant as Prepared in Example No. | Dispersant | EPPTHIOL:basic N(1) | Wt. (g.) | SIB | VIB |
|---|---|---|---|---|---|---|
| 1 | Comparative Ex. 2 | PIBSA-PAM | 0 | 0.03 | 5.65 | 7 |
| 2 | Comparative Ex. 2 | PIBSA-PAM | 0 | 0.04 | 3.67 | 6 |
| 3 | Comparative Ex. 3 | PIBSA-PAM EPPTHIOL | 0.22 | 0.03 | 5.38 | 6 |
| 4 | Comparative Ex. 3 | PIBSA-PAM-EPPTHIOL | 0.22 | 0.04 | 3.94 | 5 |
| 5 | Example 4 | PIBSA-EPPTHIOL-PAM | 0.37 | 0.03 | 4.94 | 6 |
| 6 | Example 4 | PIBSA-EPPTHIOL-PAM | 0.37 | 0.04 | 3.23 | 4 |
| 7 | Example 5 | PIBSA-EPPTHIOL-PAM | 0.26 | 0.03 | 5.19 | 5 |
| 8 | Example 5 | PIBSA-EPPTHIOL-PAM | 0.26 | 0.04 | 2.34 | 4 |

NOTES:
(1) Equivalents EPPTHIOL reacted per equivalent of basic N charged.
(2) EPPTHIOL = 2,3-epoxy-1-propanethiol.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An oil soluble dispersant adduct useful as a lubricating oil dispersant prepared by a process which comprises:
   (a) contacting (i) a long chain hydrocarbyl polymer-substituted $C_4$ to $C_{10}$ dicarboxylic acid producing material formed by reacting an olefin polymer of $C_2$ to $C_{10}$ monoolefin having a number average molecular weight of about 700 to 5,000 and a $C_4$ to $C_{10}$ monounsaturated dicarboxylic acid material, said acid producing material having an average of at least about 0.7 dicarboxylic acid producing moieties, per molecule of said olefin polymer present in the reaction mixture used to form said acid producing material; and (ii) a monoepoxy thiol, for a time and under conditions sufficient to form a first adduct monoepoxy hemi-thioester of said dicarboxylic acid producing material, and
   (b) contacting said first adduct with at least one alcohol nucleophilic reagent for a time and under conditions sufficient to form said dispersant adduct.

2. The dispersant adduct according to claim 1, wherein said monoepoxy thiol comprises at least one member selected from the group consisting of:
   (a) alicyclic monoepoxy compounds of the formula

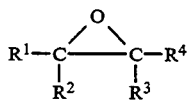

wherein $R^1$, $R^2$, $R^3$ and $R^4$ are the same or different and are H, hydrocarbyl or thiol-substituted hydrocarbyl, with the proviso that at least one of the $R^1$, $R^2$, $R^3$ and $R^4$ groups comprises thiol-substituted hydrocarbyl, and (b) monocyclic monoepoxy compounds of the formula

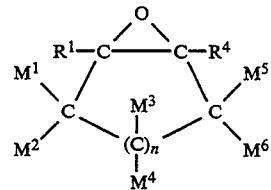

wherein $R^1$ and $R^4$ are as defined above, n is an integer of from 1 to 4, $M^1$ through $M^6$ are the same or different and are —H, hydrocarbyl, or thiol-substituted hydrocarbyl, and wherein one or more of $M^1$, $M^3$ and $M^6$ can further comprise —SH, with the proviso that at least one of $R^1$, $R^4$, $M^1$, $M^2$, $M^3$, $M^4$, $M^5$ and $M^6$ comprise thiol-substituted hydrocarbyl.

3. The dispersant adduct according to claim 2 wherein said monoepoxy thiol comprises at least one of said alicyclic monoepoxy compounds wherein $R^1$ and $R^3$ are each hydrogen and at least one of $R^2$ and $R^4$ is thiolalkyl of from 1 to 30 carbon atoms.

4. The dispersant adduct according to claim 3 wherein at least one of $R^2$ and $R^4$ is thiolalkyl of from 1 to 10 carbon atoms.

5. The dispersant adduct according to claim 4 wherein said thiolalkyl group is —$CH_2SH$.

6. The dispersant adduct according to claim 2 wherein $R^3$ and $R^4$ hydrogen.

7. The dispersant adduct according to claim 1 wherein the monoepoxy thiol comprises at least one of said cyclic monoepoxy compounds wherein $R^1$, $R^4$, $M^1$, $M^2$, $M^3$ and $R^5$ are each hydrogen and at least one of $M^4$ and $M^6$ are thiol-substituted lower alkyl.

8. The dispersant adduct according to claim 7 wherein n is 1 or 2 and at least one of $M^4$ and $M^6$ are thiol-substituted alkyl of from 1 to 4 carbon atoms.

9. The dispersant adduct according to claim 8 wherein at least one of $M^4$ and $M^6$ is —$CH_2SH$.

10. The dispersant adduct according to claim 1, wherein said hydrocarbyl substituted $C_4$ to $C_{10}$ monounsaturated dicarboxylic acid producing material comprises a polymer of about 1300 to 3000 number average molecular weight substituted with succinic anhydride moieties, said polymer comprising polyisobutylene containing up to about 40% of monomer units derived from butone-1 and/or butene-2.

11. The dispersant adduct according to claim 10 wherein said monoepoxy thiol comprises 2,3-epoxy-1-propanethiol.

12. The dispersant adduct according to claim 11, wherein said dispersant adduct is borated.

13. The dispersant adduct according to claim 12, wherein said borated dispersant adduct contains about 0.05 to 2.0 weight percent boron.

14. A lubricating oil concentrate containing from about 10 to 35 wt. % of the dispersant adduct of claim 11.

15. A lubricating oil concentrate containing from about 3 to 45 wt. % of the dispersant adduct of claim 1.

16. A process for producing a dispersant useful as a lubricating oil additive which comprises:
   (a) providing a long chain hydrocarbyl polymer-substituted $C_4$ to $C_{10}$ dicarboxylic acid producing material formed by reacting an olefin polymer of $C_2$ to $C_{10}$ monoolefin having a number average molecular weight of about 700 to 5,000 and a $C_4$ to $C_{10}$ monounsaturated dicarboxylic acid material, said acid producing material having an average of at least about 0.7 dicarboxylic acid producing moieties, per molecule of said olefin polymer present in the reaction mixture used to form said acid producing material;
   (b) providing at least one monoepoxy thiol of the formula:

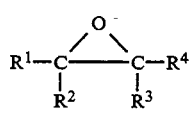

wherein $R^1$, $R^2$, $R^3$ and $R^4$ are the same or different and are H, hydrocarbyl or thiol-substituted hydrocarbyl, with the proviso that at least one of the $R^1$, $R^2$, $R^3$ and $R^4$ groups comprises thiol-substituted hydrocarbyl;
   (c) contacting said acid producing material with said monoepoxy thiol in a monoepoxy thiol:acid producing material molar ratio of not greater than about 10:1 under conditions sufficient to effect reaction of at least a portion of the thiol groups on said monoepoxy thiol compound with at least a portion of the acid-producing groups in said acid producing material, to form a monoepoxy hemi-thioester of said acid producing material; and
   (d) contacting said monoepoxy hemi-thioester with at least one alcohol nucleophilic reagent for a time and under conditions sufficient to form said dispersant adduct.

17. The process according to claim 16 wherein said hydrocarbyl substituted $C_4$ to $C_{10}$ monounsaturated dicarboxylic acid producing material comprises a polymer of about 1300 to 3000 number average molecular weight substituted with succinic anhydride moieties, said polymer comprising polyisobutylene containing up to about 40% of monomer units derived from butene-1 and/or butene-2.

18. The process according to claim 17 wherein said monoepoxy thiol comprises 2,3-epoxy-1-propanethiol.

19. The process according to claim 18, wherein said dispersant adduct is borated to provide from about 0.05 to 2.0 weight percent boron in said borated dispersant adduct.

20. The process of claim 19, wherein the ratio of acid producing moieties per molecule of olefin polymer is from about 1.0 to 1.8.

21. A process for producing a dispersant useful as a lubricating oil additive which comprises:
   (a) providing a long chain hydrocarbyl polymer-substituted $C_4$ to $C_{10}$ dicarboxylic acid producing material formed by reacting an olefin polymer of $C_2$ to $C_{10}$ monoolefin having a number average molecular weight of about 700 to 5,000 and a $C_4$ to $C_{10}$ monounsaturated dicarboxylic acid material, said acid producing material having an average of at least about 0.7 dicarboxylic acid producing moieties, per molecule of said olefin polymer present in the reaction mixture used to form said acid producing material;
   (b) providing at least one monoepoxy thiol of the formula:

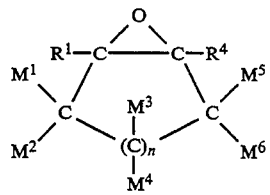

wherein n is an integer of from 1 to 4, $R^1$, $R^4$, $M^1$, $M^2$, $M^3$, $M^4$, $M^5$ and $M^6$ are the same or different and are H, hydrocarbyl or thiol-substituted hydrocarbyl, and wherein one or more of $M^1$, $M^3$ and $M^6$ can further comprise —SH, with the proviso that at least one of $R^1$, $R^4$, $M^1$, $M^2$, $M^3$, $M^4$, $M^5$ and $M^6$ comprises thiol-substituted hydrocarbyl;
   (c) contacting said acid producing material with said monoepoxy thiol in a monoepoxy thiol:acid producing material molar ratio of not greater than about 10:1 under conditions sufficient to effect reaction of at least a portion of the thiol groups on said monoepoxy thiol compound with at least a portion of the acid-producing groups in said acid producing material, to form a monoepoxy hemi-thioester of said acid producing material; and
   (d) contacting said monoepoxy hemi-thioester with at least one alcohol nucleophilic reagent for a time and under conditions sufficient to form said dispersant adduct.

22. The process according to claim 21 wherein said hydrocarbyl substituted $C_4$ to $C_{10}$ monounsaturated dicarboxylic acid producing material comprises a polymer of about 1300 to 3000 number average molecular weight substituted with succinic anhydride moieties, said polymer comprising polyisobutylene containing up to about 40% of monomer units derived from butene-1 and/or butene-2.

23. The process according to claim 22 wherein $R^1$, $R^4$, $M^1$, $M^2$, $M^3$ and $M^5$ are each hydrogen and at least one of $M^4$ and $M^6$ are thiol-substituted alkyl of from 1 to 4 carbon atoms.

24. The process according to claim 23, wherein said dispersant adduct is borated to provide from about 0.05 to 2.0 weight percent boron in said borated dispersant adduct.

25. The process of claim 24, wherein the ratio of acid producing moieties per molecule of olefin polymer is from about 1.0 to 1.8.

26. The process according to claim 21 wherein $R^1$, $R^4$, $M^1$, $M^2$, $M^3$ and $M^5$ are each hydrogen, one of $M^4$ and $M^6$ is thiol-substituted alkyl of from 1 to 4 carbon atoms and the other of $M^4$ and $M^R$ is hydrogen; wherein said polymer comprises polyisobutylene containing up to about 40% monomer units derived from butene-1 and/or butene-2 and having a number average molecular weight of from about 1300 to 3000, and wherein said polymer is substituted with from 1.0 to 1.8 moieties of succinic anhydride per molecule of said olefin polymer.

27. A lubricating oil composition containing from about 0.1 to 20 wt. % of the dispersant adduct prepared according to claim 16 or 21.

* * * * *